United States Patent
Yoon et al.

(10) Patent No.: US 12,323,690 B2
(45) Date of Patent: Jun. 3, 2025

(54) WEARABLE ELECTRONIC DEVICE FOR CONTROLLING CAMERA MODULE AND METHOD FOR OPERATING THEREOF

(71) Applicant: Samsung Electronics Co., Ltd., Suwon-si (KR)

(72) Inventors: Jongmin Yoon, Suwon-si (KR); Seungnyun Kim, Suwon-si (KR); Dongil Son, Suwon-si (KR); Seungjoo Lee, Suwon-si (KR); Gisoo Lim, Suwon-si (KR); Kyusik Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 188 days.

(21) Appl. No.: 18/328,111

(22) Filed: Jun. 2, 2023

(65) Prior Publication Data

US 2024/0073508 A1 Feb. 29, 2024

Related U.S. Application Data

(63) Continuation of application No. PCT/KR2023/006718, filed on May 18, 2023.

(30) Foreign Application Priority Data

Aug. 24, 2022 (KR) .................. 10-2022-0106064
Oct. 21, 2022 (KR) .................. 10-2022-0136365

(51) Int. Cl.
*H04N 23/61* (2023.01)
*G06F 1/16* (2006.01)
(Continued)

(52) U.S. Cl.
CPC .......... *H04N 23/611* (2023.01); *G06F 1/163* (2013.01); *H04N 23/65* (2023.01); *H04N 23/90* (2023.01)

(58) Field of Classification Search
None
See application file for complete search history.

(56) References Cited

U.S. PATENT DOCUMENTS 10,425,628 B2 9/2019 Price et al.
10,944,957 B2* 3/2021 Bleyer .................. G06T 19/006
(Continued)

FOREIGN PATENT DOCUMENTS

CN 117120962 A 11/2023
JP 2021-527998 A 10/2021
(Continued)

OTHER PUBLICATIONS

International Search Report dated Aug. 23, 2023, issued in International Patent Application No. PCT/KR2023/006718.

*Primary Examiner* — Samira Monshi
(74) *Attorney, Agent, or Firm* — Jefferson IP Law, LLP

(57) ABSTRACT

A wearable electronic device is provided. The wearable electronic device may include a housing, at least one processor included in the housing, at least one first camera module configured to capture an image for a first field of view (FOV), and at least one second camera module configured to capture an image for a second FOV different from the first FOV. The at least one processor may be configured to control the at least one first camera module to obtain first image frames at a first frame rate, based on identification, based on at least a part of the first image frames, that a user's hand is disposed in a designated area of the first FOV, control the at least one first camera module to obtain second image frames at a second frame rate greater than the first frame rate, and maintain, in an inactive state, the at least one second camera module, or activate the second camera module, and control the at least one second camera module to operate the at least one second camera module at the first frame rate.

20 Claims, 18 Drawing Sheets

(51) Int. Cl.
　　*H04N 23/611*　　(2023.01)
　　*H04N 23/65*　　(2023.01)
　　*H04N 23/90*　　(2023.01)

(56) References Cited

U.S. PATENT DOCUMENTS

| | | | |
|---|---|---|---|
| 11,328,465 | B2 | 5/2022 | Pokorny et al. |
| 2018/0136466 | A1 | 5/2018 | Ko |
| 2019/0339767 | A1 | 11/2019 | Andrew et al. |
| 2019/0387168 | A1 | 12/2019 | Smith et al. |
| 2020/0167003 | A1 | 5/2020 | Nonomura et al. |
| 2020/0241646 | A1 | 7/2020 | Hebbalaguppe et al. |
| 2020/0404159 | A1 | 12/2020 | Lei et al. |
| 2021/0216133 | A1 | 7/2021 | Stafford et al. |
| 2021/0405761 | A1 | 12/2021 | Canberk |
| 2022/0051441 | A1 | 2/2022 | Zahnert et al. |
| 2022/0103748 | A1 | 3/2022 | Canberk |
| 2022/0197378 | A1 | 6/2022 | Song et al. |
| 2022/0229298 | A1 | 7/2022 | Song et al. |
| 2022/0294986 | A1* | 9/2022 | Ha .................. G01S 3/7864 |
| 2022/0326781 | A1 | 10/2022 | Hwang et al. |
| 2023/0154134 | A1 | 5/2023 | Oh |
| 2023/0418370 | A1 | 12/2023 | Wu |

FOREIGN PATENT DOCUMENTS

| | | |
|---|---|---|
| KR | 10-1374316 B | 3/2014 |
| KR | 10-2016-0139727 A | 12/2016 |
| KR | 10-2017-0133754 A | 12/2017 |
| KR | 10-2021-0005041 A | 1/2021 |
| KR | 10-2022-0089023 A | 6/2022 |
| KR | 10-2667189 B1 | 5/2024 |
| WO | 2017/164584 A1 | 9/2017 |
| WO | 2021-261248 A1 | 12/2021 |

* cited by examiner

WEARABLE ELECTRONIC DEVICE FOR CONTROLLING CAMERA MODULE AND METHOD FOR OPERATING THEREOF

CROSS-REFERENCE TO RELATED APPLICATION(S)

This application is a continuation application, claiming priority under § 365(c), of an International application No. PCT/KR2023/006718, filed on May 18, 2023, which is based on and claims the benefit of a Korean patent application number 10-2022-0106064, filed on Aug. 24, 2022, and of a Korean patent application number 10-2022-0136365, filed on Oct. 21, 2022, in the Korean Intellectual Property Office, the disclosure of each of which is incorporated by reference herein in its entirety.

TECHNICAL FIELD

The disclosure relates to a wearable electronic device for controlling a camera module and a method of operating thereof.

BACKGROUND ART

The number of various services and additional functions provided by a wearable electronic device, such as augmented reality (AR) glasses, a head mounted display (HMD) device, or a video see-through (VST) device, is gradually increasing. In order to enhance the utility value of these type of electronic devices and satisfy the demands of various users, communication service providers or electronic device manufacturers are providing various functions and competitively developing electronic devices to differentiate themselves from other companies. Accordingly, various functions provided via the wearable electronic device are gradually advancing.

The wearable electronic device may include at least one camera module capable of capturing a foreground image. The wearable electronic device may perform simultaneous localization and mapping (SLAM) and/or 6 degrees of freedom (DoF), based on an image captured using the at least one camera module. The wearable electronic device may perform recognizing and/or tracking an object, based on the image captured using the at least one camera module, and perform an operation based on a result of the recognizing and/or tracking.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Aspects of the disclosure are to address at least the above-mentioned problems and/or disadvantages and to provide at least the advantages described below. Accordingly, an aspect of the disclosure is to provide a wearable electronic device for controlling a camera module and a method of operating thereof.

Additional aspects will be set forth in part in the description which follows and, in part, will be apparent from the description, or may be learned by practice of the presented embodiments.

In accordance with an aspect of the disclosure, a wearable electronic device is provided. The wearable electronic device may include a housing including a structure enabling wearing on at least a part of a user's head, at least one processor included in the housing, at least one first camera module configured to capture an image for a first field of view (FOV) configured with respect to one point on a first surface of the housing, and at least one second camera module configured to capture an image for a second FOV different from the first FOV configured with respect to the one point on the first surface. The at least one processor may be configured to control the at least one first camera module to obtain first image frames at a first frame rate The at least one processor may be configured to, based on identification, based on at least a part of the first image frames, that a user's hand is disposed in a designated area of the first FOV, control the at least one first camera module to obtain second image frames at a second frame rate greater than the first frame rate. The at least one processor may be configured to control the at least one second camera module to maintain, in an inactive state, the at least one second camera module, or to activate the at least one second camera module and operate the at least one second camera module at the first frame rate.

In accordance with an aspect of the disclosure, a method of operating a wearable electronic device including at least one first camera configured to capture an image for a first FOV and at least one second camera module configured to capture an image for a second FOV different from the first FOV is provided. The method includes controlling the at least one first camera module to obtain first image frames at a first frame rate. the method may include controlling the at least one first camera module to obtain second image frames at a second frame rate greater than the first frame rate, based on identification, based on at least a part of the first image frames, that a user's hand is disposed in a designated area of the first FOV. The method may include controlling the at least one second camera module to maintain the at least one second camera module in an inactive state, or to activate the at least one second camera module and operate the at least one second camera module at the first frame rate.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
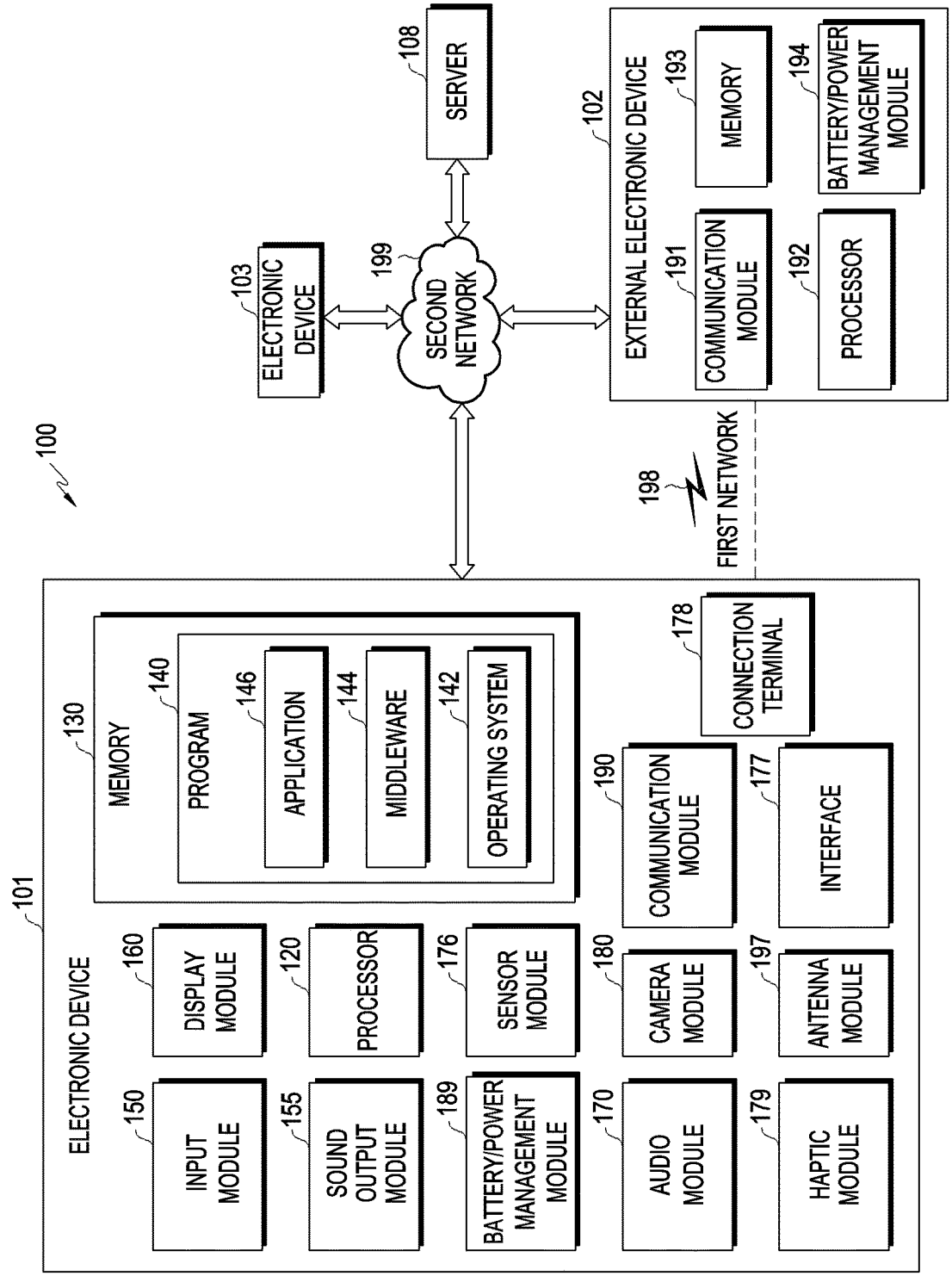
FIG. 1 is a block diagram illustrating an electronic device according to an embodiment of the disclosure.

FIG. 1 is a block diagram 100 illustrating an electronic device 101 according to an embodiment of the disclosure.

Referring to FIG. 1, the electronic device 101 may be, for example, a wearable electronic device, such as AR glasses, an HMD device, and/or a VST device, capable of being worn on a user's head. The electronic device 101 may be named a wearable electronic device. A position on a user on which the electronic device is worn is not limited, and all devices including multiple camera modules for capturing images in multiple FOVs, described below, are possible.

Each of external electronic devices 102 and 103 may be a type identical to or different from that of the electronic device 101. According to an embodiment, all or some of the operations executed in the electronic device 101 may be executed in one or more external electronic devices among external electronic devices (the external electronic devices 102 and 103 or a server 108). For example, if the electronic device 101 is required to perform a function or service automatically or in response to a request from a user or another device, the electronic device 101 may request one or more external electronic devices to perform at least a part of the function or service, in addition to or instead of executing the function or service by itself. The one or more external electronic devices having received the request may execute at least a part of the requested function or service, or an additional function or service related to the request, and may transfer a result of the execution to the electronic device 101. The electronic device 101 may or may not additionally process the result, and may provide the processed result as at least a part of a response for the request. For example, the external electronic device 102 may render content data executed in an application and then transfer the rendered content data to the electronic device 101, and the electronic device 101 having received the data may output the content data to a display module. If the electronic device 101 detects a user's movement via an inertial measurement unit (IMU) sensor, a processor 120 of the electronic device 101 may correct rendering data received from the external electronic device 102, based on information on the movement, and output the corrected rendering data to a display module 160. Alternatively, the electronic device 101 may transfer the movement information to the external electronic device 102, and request rendering so that screen data is updated according to the information. According to various embodiments, the external electronic device 102 may be various types of devices, such as a smartphone or a case device capable of storing and charging the electronic device 101.

According to an embodiment, the electronic device 101 may communicate with the external electronic device 102 over a first network 198 (e.g., a short-range wireless communication network), and/or may communicate with the external electronic device 103 or the server 108 over a second network 199 (e.g., a long-range wireless communication network). According to an embodiment, the electronic device 101 may communicate with another electronic device via the server 108. According to an embodiment, the electronic device 101 may include at least one of the processor 120, a memory 130, an input module 150, a sound output module 155, the display module 160, an audio module 170, a sensor module 176, an interface 177, a connection terminal 178, a haptic module 179, a camera module 180, a power management module and/or battery 189, a communication module 190, or an antenna module 197. In an embodiment, at least one (e.g., the connection terminal 178) of the above elements may be omitted from the electronic device 101, or one or more other elements may be added thereto. In an embodiment, some (e.g., the sensor module 176, the camera module 180, or the antenna module 197) of the elements may be integrated into a single element (e.g., the display module 160).

According to an embodiment, the processor 120 may, for example, execute software (e.g., a program 140) to control at least a different element (e.g., a hardware or software element) of the electronic device 101 connected to the processor 120, and perform various data processing or calculation. According to an embodiment, as at least a part of the data processing or calculation, the processor 120 may store, in a volatile memory, a command or data received from another element (e.g., the sensor module 176 or the communication module 190), process the command or data stored in the volatile memory, and store result data in a non-volatile memory. According to an embodiment, the processor 120 may include a main processor (e.g., a central processing device or an application processor), or an auxiliary processor (e.g., a graphics processing device, a neural processing unit (NPU), an image signal processor, a sensor hub processor, or a communication processor) which is operable independently to or together with the main processor. For example, if the electronic device 101 includes a main processor and an auxiliary processor, the auxiliary processor may be configured to use less power than that used by the main processor, or to be specialized for a designated function. The auxiliary processor may be implemented separately from the main processor, or as a part thereof. The auxiliary processor may, for example, control at least some of functions or states related to at least one element (e.g., the display module 160, the sensor module 176, or the communication module 190) among the elements of the electronic device 101 on behalf of the main processor while the main processor is in an inactive (e.g., sleep) state, or together with the main processor while the main processor is in an active (e.g., application execution) state. According to an embodiment, the auxiliary processor (e.g., an image signal processor or a communication processor) may be implemented as a part of a different element (e.g., the camera module 180 or the communication module 190) that is functionally related to the auxiliary processor. According to an embodiment, the auxiliary processor (e.g., a neural processing unit) may include a hardware structure specialized in processing an artificial intelligence model. The artificial intelligence model may be generated through machine learning. For example, such learning may be autonomously performed in the electronic device 101 in which an artificial intelligence is operated, or may be performed via a separate server (e.g., the server 108). A learning algorithm may include, for example, supervised learning, unsupervised learning, semi-supervised learning, or reinforcement learning, but is not limited to the above example. The artificial intelligence model may include a plurality of artificial neural network layers. An artificial neural network may be one of a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more of the above networks. However, the artificial neural network is not limited to the above example. The artificial intelligence model may include a software structure in addition to or in replacement of a hardware structure.

According to an embodiment, the memory 130 may store various data used by at least one element (e.g., the processor 120 or the sensor module 176) of the electronic device 101. The data may include, for example, software (e.g., the program 140), and input data or output data related to a command related thereto. The memory 130 may include a volatile memory or a non-volatile memory.

According to an embodiment, the program 140 may be stored in the memory 130 as software and, for example, may include an operating system 142, middleware 144, or an application 146.

According to an embodiment, the input module 150 may receive a command or data to be used for an element (e.g., the processor 120) of the electronic device 101 from the outside (e.g., from a user) of the electronic device 101. The input module 150 may include a microphone, a button, and/or a touch pad, but there is no limit.

According to an embodiment, the sound output module 155 may output a sound signal to the outside of the electronic device 101. The sound output module 155 may include, for example, a speaker. The speaker may be used for general purposes, such as playback of multimedia or recording.

According to an embodiment, the display module 160 may visually provide information to the outside (e.g., a user) of the electronic device 101. For example, if the electronic device 101 is implemented as AR glasses, the display module 160 may include, for example, a liquid crystal display (LCD), a digital mirror device (DMD), a liquid crystal on silicon (LCoS), a light-emitting diode (LED) on silicon (LEDoS), an organic light-emitting diode (OLED), or a micro light-emitting diode (micro LED), but there is no limit. The display module 160 may be differently implemented according to the type of the electronic device 101. For example, if the electronic device 101 is implemented as AR glasses, the display module may further include a lens and/or an optical waveguide, which will be described with reference to FIG. 2.

According to an embodiment, the audio module 170 may convert sound into an electrical signal or, conversely, may convert an electrical signal into sound. According to an embodiment, the audio module 170 may obtain sound via the input module 150, or may output sound via the sound output module 155, or an external electronic device (e.g., the external electronic device 102) (e.g., a speaker or a headphone) that is directly or wirelessly connected to the electronic device 101. The external electronic device 102 may be, for example, a mobile device, such as a smartphone or a tablet PC, but there is no limit.

According to an embodiment, the sensor module 176 may detect an operational state (e.g., power or temperature) of the electronic device 101 or an external environment state (e.g., a user's state), and generate an electrical signal or a data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, and/or an illuminance sensor.

According to an embodiment, the interface 177 may support one or more designated protocols which are usable for the electronic device 101 to be directly or wirelessly connected to an external electronic device (e.g., the external electronic device 102). According to an embodiment, the interface 177 may include, for example, a high-definition multimedia interface (HDMI), a universal serial bus (USB) interface, a secure digital (SD) card interface, or an audio interface.

According to an embodiment, the connection terminal 178 may include a connector enabling the electronic device 101 to be physically connected to an external electronic device (e.g., the external electronic device 102) therethrough. According to an embodiment, the connection terminal 178 may include, for example, an HDMI connector, a USB connector, an SD card connector, or an audio connector (e.g., a headphone connector).

According to an embodiment, the haptic module 179 may convert an electrical signal into an electrical stimulus, or a mechanical stimulus (e.g., vibration or movement) which a user is able to recognize through his/her tactile or kinesthetic sense. According to an embodiment, the haptic module 179 may include, for example, a motor, a piezoelectric element, or an electro stimulator.

According to an embodiment, the camera module 180 may capture a still image or a moving image. According to an embodiment, the camera module 180 may include one or more lenses, image sensors, image signal processors, or flashes. According to an embodiment, the electronic device 101 may include multiple camera modules for capturing images in multiple FOVs, and this will be described later.

According to an embodiment, the power management module and/or battery 189 may manage power supplied to the electronic device 101. According to an embodiment, the power management module and/or battery 189 may be implemented, for example, as at least a part of a power management integrated circuit (PMIC). The power management module and/or battery 189 may supply power to at least one element of the electronic device 101. According to an embodiment, the power management module and/or battery 189 may include, for example, a non-rechargeable primary battery, a rechargeable secondary battery, or a fuel battery.

According to an embodiment, the communication module 190 may support establishment of a direct (e.g., wired) communication channel or a wireless communication channel between the electronic device 101 and an external electronic device (e.g., the external electronic device 102, the external electronic device 103, or the server 108), and execution of communication through an established communication channel. The communication module 190 may include one or more communication processors that are operated independently to the processor 120 (e.g., an application processor), and support direct (e.g., wired) communication or wireless communication. According to an embodiment, the communication module 190 may include a wireless communication module (e.g., a cellular communication module, a short-range wireless communication module, or a global navigation satellite system (GNSS) communication module), or a wired communication module (e.g., a local area network (LAN) communication module or a power-line communication module). A corresponding communication module among the communication modules described above may communicate with the external electronic device 103 over the first network 198 (e.g., a short-range communication network, such as Bluetooth, wireless fidelity (Wi-Fi) direct, or infrared data association (IrDA)), or the second network 199 (e.g., a long-range communication network, such as a legacy cellular network, a fifth generation (5G) network, a next-generation communication network, the Internet, or a computer network (e.g., a LAN or wide area network (WAN))). Such various types of communication modules may be integrated into one element (e.g., a single chip), or may be implemented as multiple separate elements (e.g., multiple chips). The wireless communication module may identify or authenticate the electronic device 101 in a communication network, such as the first network 198 or the second network 199, by using subscriber information (e.g., an international mobile subscriber identifier (IMSI)) stored in a subscriber identification module.

The wireless communication module may support a 5G network and next-generation communication technology beyond fourth generation (4G) networks, for example, a new radio (NR) access technology. The NR access technology may support high-speed transfer of a large amount of data (enhanced mobile broadband (eMBB)), terminal power minimization and access by multiple terminals (massive machine type communications (mMTC)), or high reliability and low latency (ultra-reliable and low-latency communications (URLLC)). The wireless communication module may support, for example, a high frequency band (e.g., millimeter wave (mmWave) band) in order to accomplish a high data transfer rate. The wireless communication module may support various technologies for ensuring performance in high frequency bands, for example, beamforming, massive multiple-input and multiple-output (massive MIMO), full-dimensional MIMO (FD-MIMO), an array antenna, analog beamforming, or a large-scale antenna. The wireless communication module may support various requirements regulated in the electronic device 101, an external electronic device (e.g., the external electronic device 103), or a network system (e.g., the second network 199). According to an embodiment, the wireless communication module may support a peak data rate (e.g., 20 gigabits per second (Gbps) or higher) for implementation of eMBB, a loss coverage (e.g., 164 dB or lower) for implementation of mMTC, or a U-plane latency (e.g., 0.5 ms or lower for each of downlink (DL) and uplink (UL), or 1 ms or lower for round trip) for implementation of URLLC. As described above, if the electronic device 101 supports cellular communication, such as 4G or 5G, the electronic device 101 may be called a standalone (SA) type electronic device. Meanwhile, the electronic device 101 may be implemented not to support cellular communication, such as 4G or 5G. In this case, the electronic device 101 may use the first network 198 to use the Internet via the external electronic device 102 supporting cellular communication, and may be named a non-standalone type electronic device.

According to an embodiment, the antenna module 197 may transmit a signal or power to the outside (e.g., an external electronic device) or receive same from the outside. According to an embodiment, the antenna module 197 may include an antenna including a radiator configured by a conductive pattern or a conductor disposed on a substrate (e.g., a printed circuit board (PCB)). According to an embodiment, the antenna module 197 may include multiple antennas (e.g., an array antenna). In this case, at least one antenna suitable for a communication scheme used in a communication network, such as the first network 198 or the second network 199, may be selected, for example, from among the multiple antennas by the communication module 190. A signal or power may be transmitted or received between the communication module 190 and an external electronic device through the selected at least one antenna. According to an embodiment, a component (e.g., a radio-frequency integrated circuit (RFIC)) other than the radiator may be additionally provided as a part of the antenna module 197.

According to an embodiment, the antenna module 197 may configure an mmWave antenna module. According to an embodiment, the mmWave antenna module may include a printed circuit board, an RFIC that is disposed on or adjacent to a first surface (e.g., the bottom surface) of the printed circuit board and is capable of support a designated high frequency band (e.g., an mmWave band), and multiple antennas (e.g., an array antenna) that are arranged on or adjacent to a second surface (e.g., the top surface or side surface) of the printed circuit board and are capable of transmit or receive a signal in the designated high frequency band.

At least some of the elements may be connected to each other and exchange a signal (e.g., a command or data) with each other through a communication scheme between peripheral devices (e.g., a bus, a general-purpose input/output (GPIO), a serial peripheral interface (SPI), or a mobile industry processor interface (MIPI)). According to an embodiment, a command or data may be transmitted or received between the electronic device 101 and the external electronic device 103 via the server 108 connected to the second network 199. Each of the external electronic devices 102 or 103 may be a device that is of a type identical to or different from that of the electronic device 101. According to an embodiment, all or some of operations executed in the electronic device 101 may be executed in one or more external electronic devices among the external electronic devices 102, 103, or 108. For example, in the case where the electronic device 101 is required to perform a function or service automatically or in response to a request from a user or another device, the electronic device 101 may request one or more external electronic devices to perform at least a part of the function or service, in addition to or instead of executing the function or service by itself. The one or more external electronic devices having received the request may execute at least a part of the requested function or service, or an additional function or service related to the request, and may transfer a result of the execution to the electronic device 101. The electronic device 101 may or may not additionally process the result and may provide the processed result as at least a part of a response for the request. To this end, for example, cloud computing, distributed computing, mobile edge computing (MEC), or client-server computing technology may be used. The electronic device 101 may provide, for example, an ultra-low latency service by using distributed computing or mobile edge computing. In another embodiment, the external electronic device 103 may include an Internet of things (IoT) device. The server 108 may be an intelligent server using machine learning and/or a neural network. According to an embodiment, the external electronic device 103 or the server 108 may be included in the second network 199. The electronic device 101 may be applied to intelligent services (e.g., smart homes, smart cities, smart cars, or health care), based on 5G communication technology and IoT-related technology.

A communication module 191 included in the external electronic device 102 may be implemented to be identical or similar to, for example, the communication module 190, but there is no limit. Furthermore, all devices capable of communication by wire and/or wirelessly are possible. A memory 193 may be implemented to be identical or similar to the memory 130, but there is no limit and all devices capable of storing/loading data are possible. A processor 192 may be implemented to be identical or similar to the processor 120, but there is no limit and all the devices capable of executing an instruction (or program) are possible. A battery/power management module 194 may be implemented to be identical or similar to the battery/power management module 189, but there is no limit and all devices capable of supplying power are possible.

Figure 2:
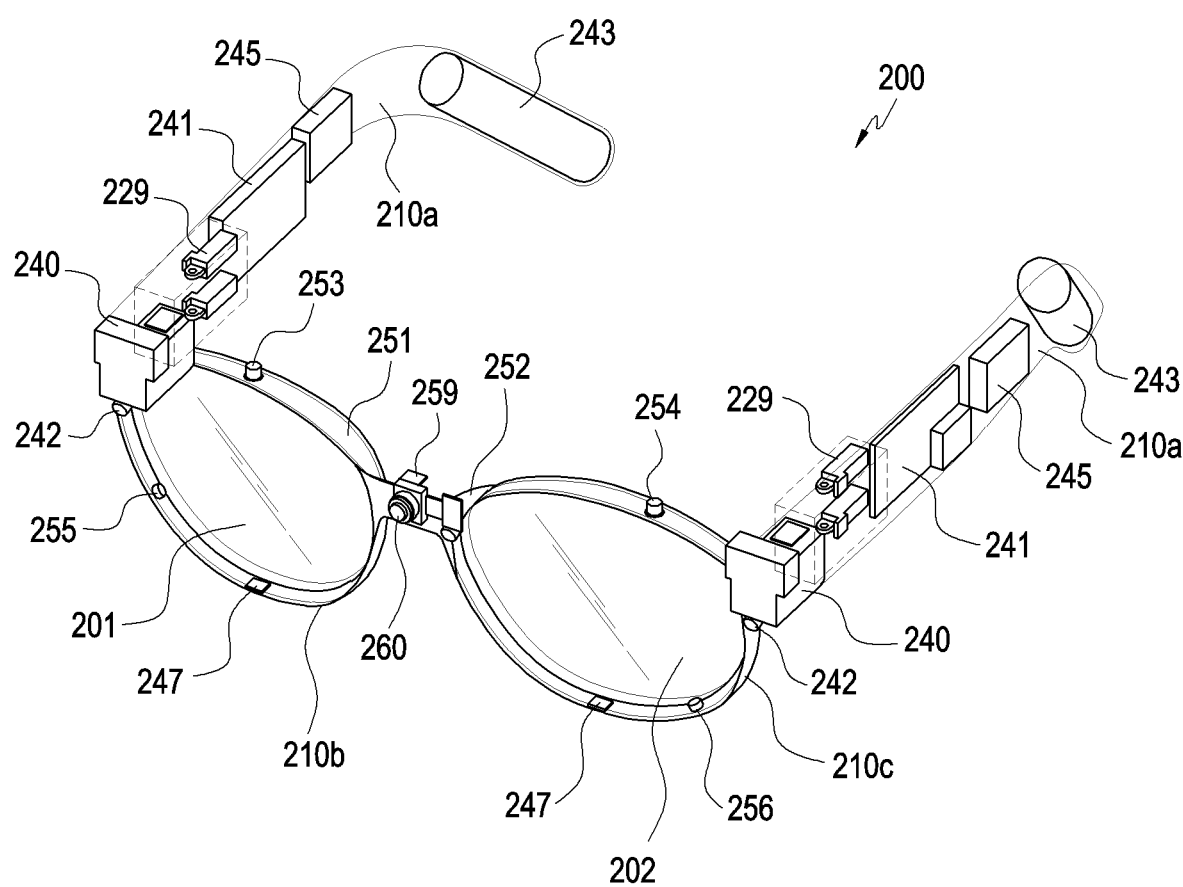
FIG. 2 is a perspective view illustrating an internal configuration of an electronic device according to an embodiment of the disclosure.

FIG. 2 is a perspective view illustrating an internal configuration of an electronic device according to an embodiment of the disclosure. An embodiment of FIG. 2 will be described with reference to FIG. 3.

Figure 3:
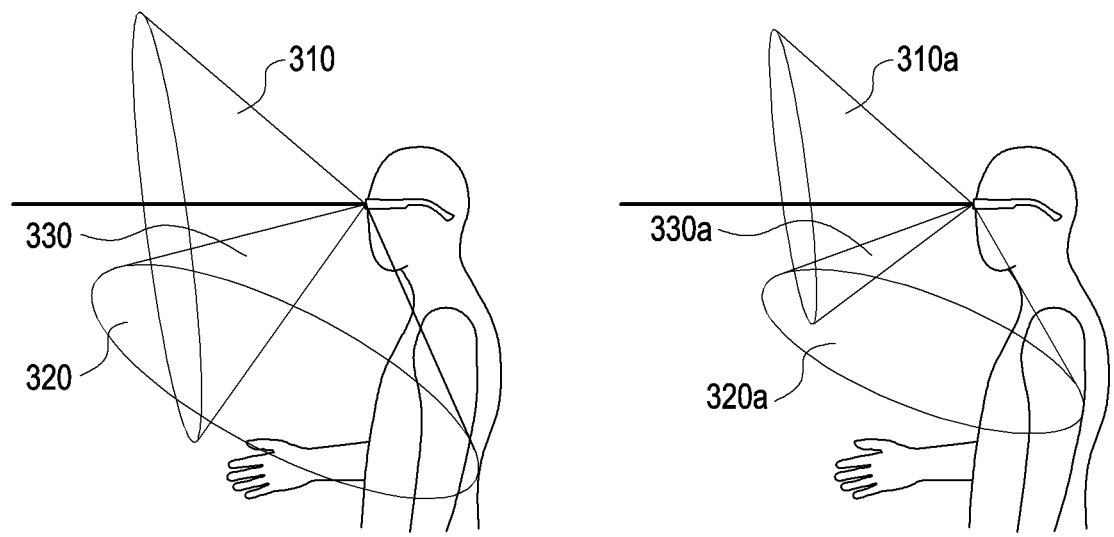
FIG. 3 is a diagram illustrating fields of view (FOVs) corresponding to multiple camera modules according to an embodiment of the disclosure.

FIG. 3 is a diagram illustrating fields of view (FOVs) corresponding to multiple camera modules according to an embodiment of the disclosure. An electronic device 200 of FIG. 2 may be an electronic device 101 of FIG. 1.

Referring to FIG. 2, the electronic device 200 according to an embodiment may include components that are accommodated in housings 210a, 210b, and 210c, are arranged on the housings 210a, 210b, and 210c, and/or are exposed through openings provided on the housings 210a, 210b, and 210c.

According to an embodiment, the electronic device 200 may obtain a visual image of an object or an environment positioned in a direction (e.g., a −Y direction) in which a user looks or the electronic device 200 is oriented, by using multiple camera modules 253, 254, 255, and 256. The camera modules 253 and 254 may be arranged on substantially upper parts of the housings 210b and 210c (or may be exposed through openings provided on the housings 210b and 210c). The camera modules 253 and 254 may capture an image corresponding to an FOV based on at least one point on the housings 210b and 210c, for example, an FOV corresponding to a substantially upper side when a user puts on the electronic device 200. For example, referring to FIG. 3, the camera modules 253 and 254 may capture an image corresponding to a first FOV 310. The image obtained by the camera modules 253 and 254 may be used, for example, for SLAM and/or 6DoF, and/or to recognize and/or track a subject corresponding to the first FOV 310. The image obtained by the camera modules 253 and 254 may also be used for head tracking. As illustrated in the right side of FIG. 3, the extent of a part 330a in which a first FOV 310a and a second FOV 320a overlap with each other may be variously implemented, and there is no limit.

According to an embodiment, the camera modules 255 and 256 may be arranged on substantially lower parts of the housings 210b and 210c (or may be exposed through openings provided on the housings 210b and 210c). The upper parts corresponding to the camera modules 253 and 254 and the lower parts corresponding to the camera modules 255 and 256 are defined for a case where a user puts on the electronic device 200. A person who skilled in the art would understand that a part relatively close to the ground being called a lower part, and a part relatively far away from the ground being called an upper part are merely for convenience of explanation. The camera modules 255 and 256 may capture an image corresponding to an FOV based on at least one point on the housings 210b and 210c, for example, an FOV corresponding to a substantially lower side when a user puts on the electronic device 200. For example, referring to FIG. 3, the camera modules 255 and 256 may capture an image corresponding to a second FOV 320. The image obtained by the camera modules 255 and 256 may be used to recognize and/or track a subject corresponding to the second FOV 320. For example, the image obtained by the camera modules 255 and 256 may be used to recognize and/or track a subject disposed relatively lower than a part corresponding to a user's head when the user puts on the electronic device 200 (e.g., the subject is the user's hand), but the disclosure is not limited thereto.

As illustrated in FIG. 3, the arrangement positions and/or the arrangement directions of the camera modules 253 and 254 and the camera modules 255 and 256 may be determined to allow existence of a part 330 in which the first FOV 310 and the second FOV 320 overlap with each other, but these merely correspond to an example. The arrangement positions and/or the arrangement directions of the camera modules 253 and 254 and the camera modules 255 and 256 may be determined to allow absence of the part in which the first FOV 310 and the second FOV 320 overlap with each other, and there is no limit to whether the FOVs 310 and 320 overlap with each other.

According to an embodiment, the electronic device 200 may recognize and/or track a subject by using at least one image captured by the camera modules 253, 254, 255, and 256. The electronic device 200 may perform an operation identified based on a result of the recognition and/or tracking and, for example, may provide a visual object at a position corresponding to the subject. However, there is no limit to the operation. For example, if a virtual keyboard is provided by the electronic device 200, keys designated on the virtual keyboard may be recognized based on a result of tracking a user's hand. An operation corresponding to a result of recognition and/or tracking may be performed, for example, solely by the electronic device 200, but this corresponds to an example. The operation may be performed based on cooperation between an external electronic device (e.g., the external electronic device 102, the external electronic device 103, and/or the server 108 in FIG. 1) and the electronic device 200.

According to an embodiment, the camera modules 253, 254, 255, and 256 is for head tracking, hand detection, hand tracking, and/or space recognition using 3DoF or 6DoF, may be a global shutter (GS) camera but there is no limit, and may also be implemented as a rolling shutter (RS) camera.

According to an embodiment, camera modules 251 and 252 are eye tracking (ET) cameras, and an image captured by the camera modules 251 and 252 may be used to detect and/or track the pupils. For example, by using the captured image, the position of a virtual image projected onto the electronic device 200 may be determined to be positioned according to a direction in which the pupils of a wearer of the electronic device 200 are oriented. The camera modules 251 and 252 may be implemented as a GS camera to detect and/or track the pupils, but there is no limit.

According to an embodiment, the display module 240 may include, for example, a liquid crystal display (LCD), a digital mirror device (DMD), a liquid crystal on silicon (LCoS), an organic light-emitting diode (OLED), or a micro light-emitting diode (micro LED). Although not illustrated, if the display module 240 is configured by one of a liquid crystal display, a digital mirror device, or a liquid crystal on silicon, the electronic device 200 may include a light source that emits light to a screen output area of the display module 240. In another embodiment, if the display module 240 is able to autonomously generate light, for example, is configured by one of an organic light-emitting diode or a micro LED, the electronic device 200 may provide, to a user, a virtual image having a favorable quality without including a separate light source. In an embodiment, if the display module 240 is implemented by organic light-emitting diodes or micro LEDs, a light source is not required, and thus weight reduction of the electronic device 200 may be accomplished. The electronic device 200 may include the display module 240, a first transparent member 201, and/or a second transparent member 202, and a user may use the electronic device 200 by wearing same on the face. The first transparent member 201 and/or the second transparent member 202 may be made of a glass plate, a plastic plate, or polymer, and may be manufactured to be transparent or semi-transparent. An optical waveguide may transfer the light generated from the display module 240 to a user's eye. The optical waveguide may be manufactured of glass, plastic, or polymer, and may include a nano pattern disposed on a part of an inner or outer surface thereof, for example, a grating structure having a polygonal shape or a curved surface shape. According to an embodiment, the light incident into one end of a waveguide tube may be provided to a user by being propagated in the display waveguide by the nano pattern. In addition, the optical waveguide configured by a free-form prism may provide incident light to a user through a reflective mirror. The optical waveguide may include at least one of at least one diffractive element (e.g., a diffractive optical element (DOE) or a holographic optical element (HOE)) or reflective element (e.g., a reflective mirror). The optical waveguide may guide the display light emitted from a light source unit, to a user's eye by using the at least one diffractive element or reflective element included in the optical waveguide. According to various embodiments, the diffractive element may include an input optical member/output optical member (not illustrated). For example, the input optical member may denote an input grating area and the output optical member (not illustrated) may denote an output grating area. The input grating area may act as an input node that diffracts (or reflects) the light output from a light source unit (e.g., micro LEDs), to be transferred to a transparent member (e.g., the first transparent member 201 and the second transparent member 202) of a screen display part. The output grating area may act as an exit that diffracts (or reflects), to a user's eye, the light transferred to the transparent member (e.g., the first transparent member 201 and the second transparent member 202) of the waveguide. According to various embodiments, the reflective element may include a total reflection optical element or a total reflection waveguide for total internal reflection (TIR). For example, total reflection is a method of guiding light, and may denote making an incidence angle to allow the light (e.g., virtual image) input through the input grating area to be reflected 100% on one surface (e.g., a particular surface) of the waveguide, and thus be transferred 100% to the output grating area. In an embodiment, the light emitted from the display module 240 may be guided along a light path to the waveguide through the input optical member. The light moving in the waveguide may be guided toward a user's eye through the output optical member. The screen display part may be determined based on the light emitted toward the eye. According to an embodiment, the first transparent member 201 may be disposed to face a user's right eye, and the second transparent member 202 may be disposed to face the user's left eye. According to various embodiments, if the display module 240 is transparent, the display module may be disposed at a position facing a user's eye and configures the screen display part. The electronic device 200 may further include a lens. The lens may adjust a focal point so that a screen output to the display module 240 is visible to a user's eye. For example, the lens may be configured by a Fresnel lens, a Pancake lens, or a multi-channel lens.

According to an embodiment, a circuit board 241 may include components for driving the electronic device 200. For example, the circuit board 241 may include at least one integrated circuit chip, and at least one of the processor 120, a memory (e.g., the memory 130 in FIG. 1), a power management module (e.g., the power management module/battery 189 in FIG. 1), or the communication module (e.g., the communication module 190 in FIG. 1) may be provided in the at least one integrated circuit chip. According to an embodiment, the circuit board 241 may be disposed in a wearing member and/or a lens frame of a housing 210*a*, 210*b*, 210*c*. According to an embodiment, the circuit board 241 may be electrically connected to a battery 243 through a power transfer structure. According to an embodiment, the circuit board 241 may be connected to a flexible printed circuit board, and may transfer an electrical signal to electronic components (e.g., a light output module, the camera modules 251, 252, 253, 254, 255, and 256, and a light emitting unit) of the electronic device through the flexible printed circuit board. According to an embodiment, the circuit board 241 may include a circuit board including an interposer.

According to an embodiment, the battery 243 may be electrically connected to a component of the electronic device 200 through the power transfer structure, and may supply power to components of the electronic device 200. According to an embodiment, at least a part of the battery 243 may be disposed in the wearing member.

According to an embodiment, a speaker module 245 may convert an electrical signal into a sound. At least a part of the speaker module 245 according to an embodiment may be disposed in the wearing member and/or the lens frame of the housing 210*a*, 210*b*, 210*c*. According to an embodiment, the speaker module 245 may be disposed between the circuit board 241 and the battery 243 to correspond to a user's ear. The speaker module 245 according to an embodiment may transmit auditory information to a user through low-frequency vibration of the user's skin and bones.

According to an embodiment, a microphone module 247 may convert a sound into an electrical signal. According to an embodiment, the microphone module 247 may be disposed on at least a part of the lens frame and/or the wearing member.

According to an embodiment, the electronic device 200 may recognize a user's voice and/or an external sound by using the at least one microphone module 247. According to an embodiment, the electronic device 200 may distinguish between voice information and ambient noise, based on voice information and/or additional information (e.g., low-frequency vibration of a user's skin and bones) obtained via the at least one microphone module. For example, the electronic device 200 may perform a function (e.g., noise canceling) enabling clear recognition of a user's voice while reducing ambient noise.

According to an embodiment, a camera module 259 may include an infrared (IR) camera module (e.g., a time-of-flight (TOF) camera or a structured light camera). For example, the IR camera may be operated as at least a part of a sensor module (e.g., a sensor module or a Lidar sensor) for sensing a distance from a subject. According to an embodiment, the electronic device 101 may further include a sensor module (e.g., a Lidar sensor). For example, the sensor module may include at least one of a vertical cavity surface emitting laser (VCSEL), an infrared sensor, and/or a photodiode.

An illumination LED 242 may have various uses according to the attachment position thereof. For example, the illumination LED 242 attached around a frame may be used as an auxiliary means for enabling easy gaze detection when an eye's movement is tracked using the ET camera modules 251 and 252, and an IR LED using infrared wavelengths is mainly used. As another example, the illumination LED 242 may be attached to be adjacent to a camera module mounted around a bridge connecting frames, or around a hinge 229 connecting the frame and a temple, so as to be used as a means for supplementing ambient brightness at the time of camera image capturing. An image capturing camera module 260 may capture, for example, a relatively high quality image of the foreground of the electronic device 200.

Figure 4A:
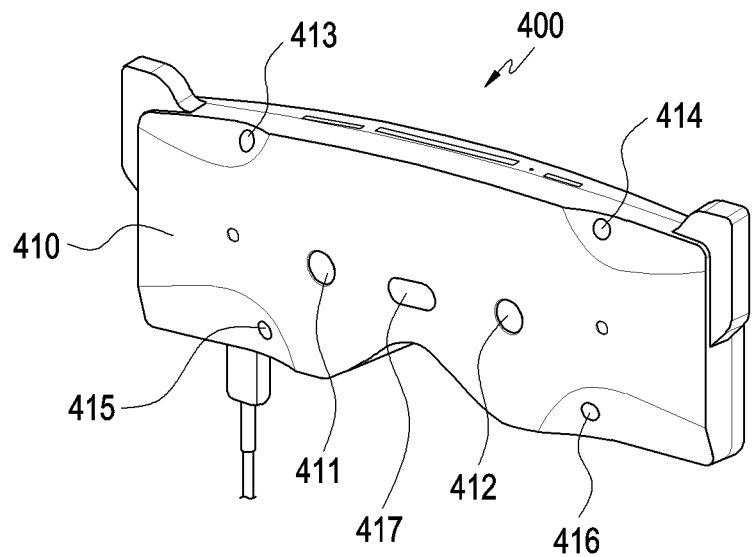
FIGS. 4A and 4B are perspective views illustrating a configuration of an electronic device according to various embodiments of the disclosure.
Figure 4B:
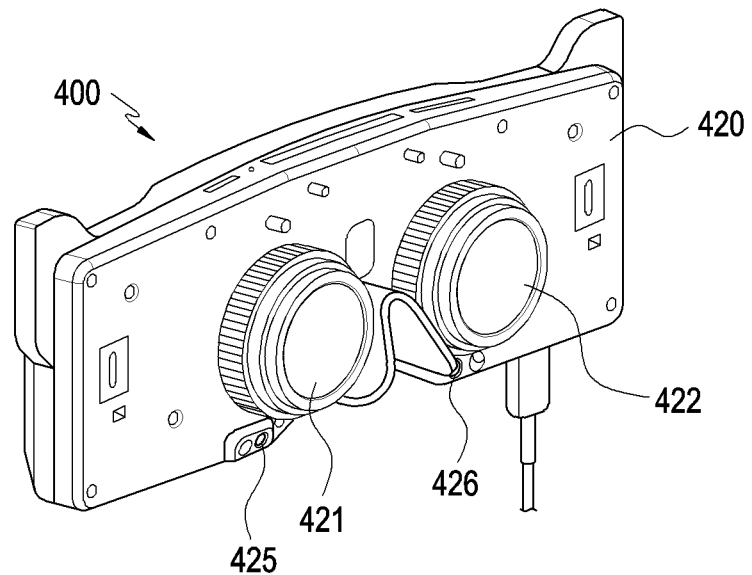

FIGS. 4A and 4B are perspective views illustrating a configuration of an electronic device according to various embodiments of the disclosure. An electronic device 400 of FIGS. 4A and 4B may be the electronic device 200 of FIG. 1.

Referring to FIGS. 4A and 4B, the electronic device 400 according to an embodiment may include housings 410 and 420. Video see-through (VST) camera modules 411 and 412 for VST, multiple camera modules 413, 414, 415, and 416, and/or a depth sensor 417 (e.g., this may be a Lidar sensor, but is not limited thereto) may be arranged on the housing 410 (or the VST camera modules 411 and 412, the multiple camera modules 413, 414, 415, and 416, and/or the depth sensor 417 may be exposed through openings provided on the housing 410). For example, the camera modules 413 and 414 may capture an image corresponding to a relatively upper FOV (e.g., the first FOV 310 in FIG. 3). For example, the camera modules 415 and 416 may capture an image corresponding to a relatively lower FOV (e.g., the second FOV 320 in FIG. 3). As described with reference to FIG. 2, the arrangement positions and/or the arrangement directions of the camera modules 413 and 414 and the camera modules 415 and 416 may be determined to allow existence of the part 330 in which the first FOV 310 and the second FOV 320 overlap with each other, but these merely correspond to an example. The arrangement positions and/or the arrangement directions of the camera modules 413 and 414 and the camera modules 415 and 416 may be determined to allow absence of the part in which the first FOV 310 and the second FOV 320 overlap with each other, and there is no limit to whether the FOVs 310 and 320 overlap with each other. The depth sensor 417 may be used for identification of a distance from an object, like ToF.

According to an embodiment, a display module and/or lenses 421 and 422, and/or face tracking camera modules 425 and 426 may be arranged on the housing 420 (or the display module and/or the lenses 421 and 422, and/or the face tracking camera modules 425 and 426 may be exposed through openings provided on the housing 420). The face tracking camera modules 425 and 426 may be used to detect and track a user's facial expression.

The camera modules 255 and 256 of FIG. 2 and/or the camera modules 415 and 416 of FIGS. 4A and 4B may be used to recognize and/or track a subject disposed relatively lower than a part corresponding to a user's head when the user puts on the electronic device 200 or 400 (e.g., the subject is the user's hand) Accordingly, while recognition and/or tracking of the hand is not required, turning on the camera modules 255 and 256 and/or the camera modules 415 and 416 may cause waste of power and/or resources. In addition, while recognition and/or tracking of the hand is not required, controlling the camera modules 255 and 256 and/or the camera modules 415 and 416 to capture an image at a relatively high frame rate may also cause waste of power and/or resources. Accordingly, while recognition and/or tracking of the hand (or this may be a different type of an object, and there is no limit) is not required, a camera module (e.g., the camera modules 255 and 256 of FIG. 2 and/or the camera modules 415 and 416 of FIGS. 4A and 4B) for capturing an image in a relatively lower FOV may be turned off and/or the frame rate thereof may be controlled, whereby waste of power and/or resources may be prevented.

Figure 5A:
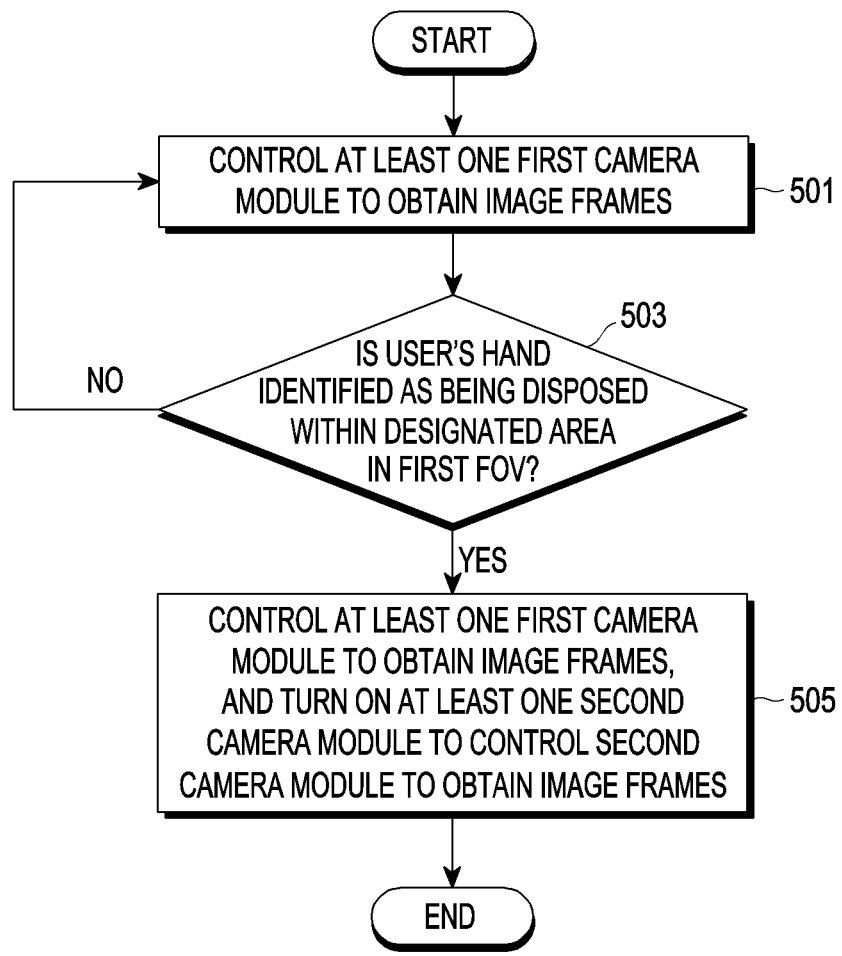
FIG. 5A is a flowchart illustrating a method of operating an electronic device according to an embodiment of the disclosure.
Figure 5B:
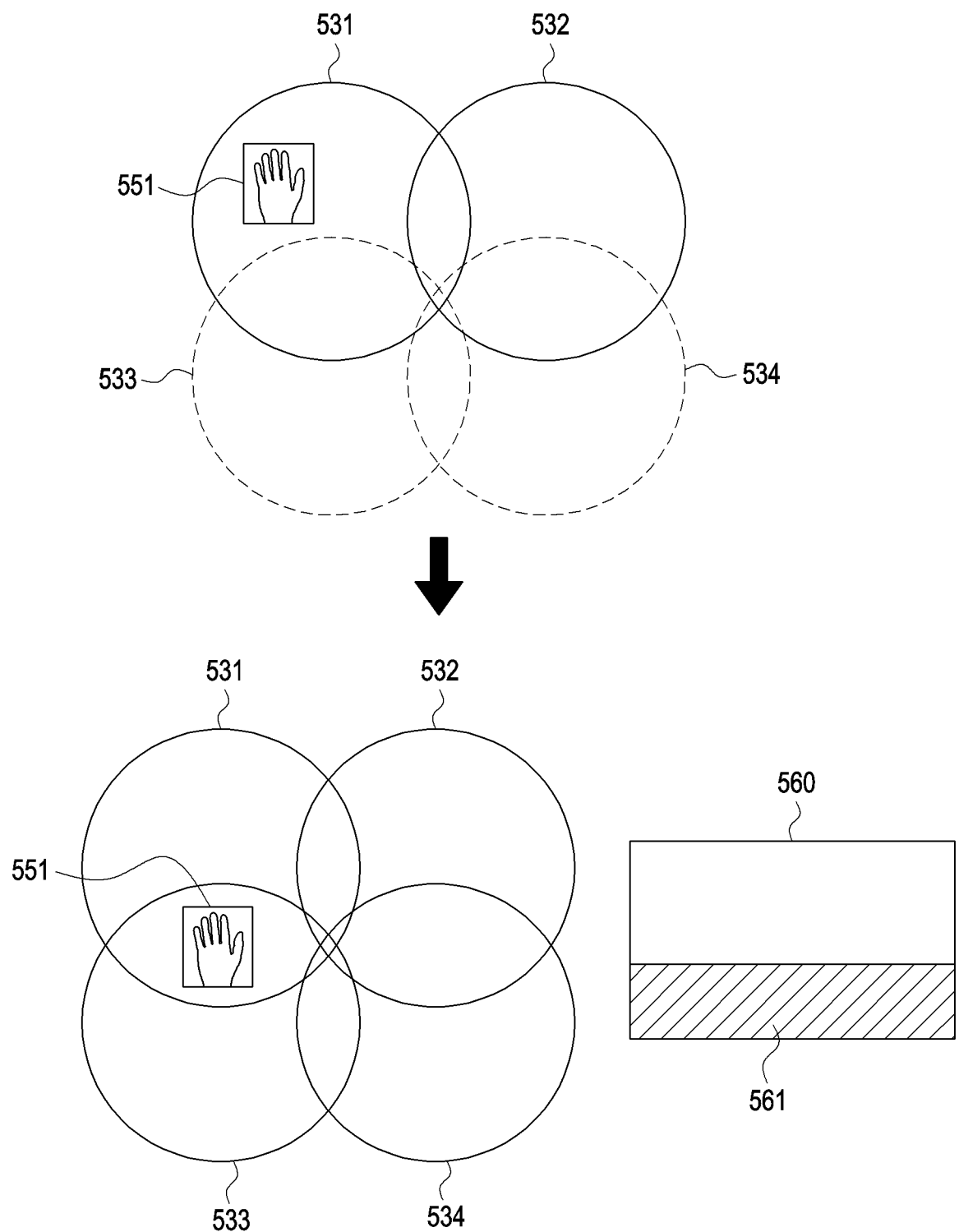
FIG. 5B is a diagram illustrating FOVs corresponding to multiple camera modules according to an embodiment of the disclosure.

FIG. 5A is a flowchart illustrating a method of operating an electronic device according to an embodiment of the disclosure. An embodiment of FIG. 5A will be described with reference to FIG. 5B. FIG. 5B is a diagram illustrating FOVs corresponding to multiple camera modules according to an embodiment of the disclosure.

Referring to FIG. 5A, according to an embodiment, the electronic device 101 (e.g., the processor 120) may, in operation 501, control at least one first camera module (e.g., the camera modules 253 and 254 of FIG. 2 or the camera modules 413 and 414 of FIGS. 4A and 4B) to obtain image frames. The at least one first camera module may capture, for example, an image corresponding to a first FOV (e.g., the first FOV 310 in FIG. 3). For example, referring to FIG. 5B, a first sub FOV 531 and a second sub FOV 532 may correspond to the first FOV 310 in FIG. 3. FIG. 3 illustrates FOVs viewed from the lateral side, and thus the first FOV 310 has been illustrated as though the number thereof were one. However, as illustrated in FIG. 5B, the first sub FOV 531 and the second sub FOV 532 corresponding to multiple camera modules (e.g., the camera modules 253 and 254 of FIG. 2 or the camera modules 413 and 414 of FIGS. 4A and 4B) may be defined. For example, the camera module 253 of FIG. 2 may capture an image corresponding to the first sub FOV 531, and the camera module 254 of FIG. 2 may capture an image corresponding to the second sub FOV 532. If the camera modules 253 and 254 of FIG. 2 are arranged at substantially the same height, the first sub FOV 531 and the second sub FOV 532 may also be defined to be positioned at substantially the same height. For example, the camera module 413 of FIGS. 4A and 4B may capture an image corresponding to the first sub FOV 531, and the camera module 414 of FIGS. 4A and 4B may capture an image corresponding to the second sub FOV 532. If the camera modules 413 and 414 of FIGS. 4A and 4B are arranged at substantially the same height, the first sub FOV 531 and the second sub FOV 532 may also be defined to be positioned at substantially the same height.

According to an embodiment, the electronic device 101 may perform an operation corresponding to the image frames captured using the at least one first camera module (e.g., the camera modules 253 and 254 of FIG. 2 or the camera modules 413 and 414 of FIGS. 4A and 4B) by using the image frames. For example, the electronic device 101 may perform space recognition based on 6DoF and/or SLAM by using image frames captured with respect to the first sub FOV 531 and the second sub FOV 532 by using the at least one first camera module (e.g., the camera modules 253 and 254 of FIG. 2 or the camera modules 413 and 414 of FIGS. 4A and 4B). For example, the electronic device 101 may recognize and/or track a subject positioned in the first sub FOV 531 and the second sub FOV 532 by using image frames captured with respect to the first sub FOV 531 and the second sub FOV 532 by using the at least one first camera module (e.g., the camera modules 253 and 254 of FIG. 2 or the camera modules 413 and 414 of FIGS. 4A and 4B). For example, if a first subject is positioned in the first sub FOV 531 and the second sub FOV 532, the electronic device 101 may control the display module 160 to display a visual object corresponding to the first subject. For example, the visual object corresponding to the first subject may be determined based on a result of the recognition and/or tracking of the first subject, and the above operations may be performed by the electronic device 101 and/or the server 108. For example, the visual object corresponding to the first subject may be association information on the subject for an AR service. For example, the visual object corresponding to the subject may be a visual object designated for the first subject for a VR service. Provision of the visual object merely corresponds to an example, and thus there is no limit to an operation of the electronic device 101 associated with the result of the recognition and/or tracking of the first subject.

According to an embodiment, while the at least one first camera module (e.g., the camera modules 253 and 254 of FIG. 2 or the camera modules 413 and 414 of FIGS. 4A and 4B) is being controlled to obtain image frames, at least one second camera module (e.g., the camera modules 255 and 256 of FIG. 2 or the camera modules 415 and 416 of FIGS. 4A and 4B) may maintain a turn-off state. The at least one second camera module may capture, for example, an image corresponding to a second FOV (e.g., the second FOV 320 in FIG. 3). For example, referring to FIG. 5B, a third sub FOV 533 and a fourth sub FOV 534 may correspond to the second FOV 320 in FIG. 3. FIG. 3 illustrates FOVs viewed from the lateral side, and thus the second FOV 320 has been illustrated as though the number thereof were one. However, as illustrated in FIG. 5B, the third sub FOV 533 and the fourth sub FOV 534 corresponding to multiple camera modules (e.g., the camera modules 255 and 256 of FIG. 2 or the camera modules 415 and 416 of FIGS. 4A and 4B) may be defined. For example, the camera module 255 of FIG. 2 may capture an image corresponding to the third sub FOV 533, and the camera module 256 of FIG. 2 may capture an image corresponding to the fourth sub FOV 534. If the camera modules 255 and 256 of FIG. 2 are arranged at substantially the same height, the third sub FOV 533 and the fourth sub FOV 534 may also be defined to be positioned at substantially the same height. For example, the camera module 415 of FIGS. 4A and 4B may capture an image corresponding to the third sub FOV 533, and the camera module 416 of FIGS. 4A and 4B may capture an image corresponding to the fourth sub FOV 534. If the camera modules 415 and 416 of FIGS. 4A and 4B are arranged at substantially the same height, the third sub FOV 533 and the fourth sub FOV 534 may also be defined to be positioned at substantially the same height. As described above, the third sub FOV 533 and the fourth sub FOV 534 may be defined to be lower than the first sub FOV 531 and the second sub FOV 532. Accordingly, in a situation where recognition and/or tracking of a subject is not required at the relatively lower side, the at least one second camera module (e.g., the camera modules 255 and 256 of FIG. 2 or the camera modules 415 and 416 of FIGS. 4A and 4B) is turned off, whereby power and/or resources may be saved. The third sub FOV 533 and the fourth sub FOV 534 being shown as dotted lines in FIG. 5B may imply that at least one camera module (e.g., the camera modules 255 and 256 of FIG. 2 or the camera modules 415 and 416 of FIGS. 4A and 4B) for capturing an image in the third sub FOV 533 and the fourth sub FOV 534 has been turned off.

According to an embodiment, the electronic device 101 may, in operation 503, identify whether a user's hand (this is an example, and there is no limit to an object to be recognized) is disposed within a designated area in the first FOV. The designated area may be defined to be positioned to be, for example, relatively lower than the first FOV. For example, referring to FIG. 5B, an image 560 corresponding to the first FOV is illustrated. The image 560 may be an image captured by at least one first camera. In an example, the image 560 may be one of an image captured by the camera module 253 of FIG. 2 and an image captured by the camera module 254. In an example, the image 560 may be an image generated using an image captured by the camera module 253 of FIG. 2 and an image captured by the camera module 254. Referring to FIG. 5B, a first area 561 in the image 560 is defined, and the first area 561 may correspond to a designated area of an FOV. The designated area in the first FOV may include, for example, at least a part of the area 330 in which the FOVs overlap with each other in FIG. 3, but this corresponds to an example and there is no limit. The first FOV and the second FOV may not overlap with each other, and thus a person who skilled in the art would understand that the designated area is a relatively lower area of the first FOV and is not limited thereto. Operation 503 of identifying whether a user's hand is disposed within the designated area in the first FOV may be interpreted as an operation of identifying whether a user's hand is disposed within the first area 561 of the image 560 (or may be implemented by substituting for the operation). A determination on whether the user's hand is disposed within the first area 561 may be performed by whether the entirety of the user's hand is positioned within the first area 561, or whether the user's hand is included in the first area 561 at a particular ratio or greater. However, a person who skilled in the art would understand that the determination method is not limited. For example, as illustrated in FIG. 5B, the user's hand 551 may be positioned at a relatively upper side of the first sub FOV 531 at a first time point, and then moved to a relatively lower side of the first sub FOV 531 at a second time point. The electronic device 101 may recognize the user's hand, based on analysis of an image captured at the first time point. The electronic device 101 may track the recognized hand. The electronic device 101 may identify, from a result of the tracking, that the recognized hand is disposed in the designated area of the first FOV (e.g., an object corresponding to the hand is moved to the first area 561 of the image 560). Alternatively, the electronic device 101 may determine that a result of recognizing an object included in the first area 561 of the image 560 indicates that the object is the user's hand, and there is no limit to the method of identifying, by the electronic device 101, whether the user's hand is positioned within the designated area of the first FOV.

If it is determined that the user's hand is positioned within the designated area of the first FOV (operation 503—YES), according to an embodiment, the electronic device 101 may, in operation 505, control the at least one first camera module (e.g., the camera modules 253 and 254 of FIG. 2 or the camera modules 413 and 414 of FIGS. 4A and 4B) to obtain image frames, and turn on the at least one second camera module (e.g., the camera modules 255 and 256 of FIG. 2 or the camera modules 415 and 416 of FIGS. 4A and 4B) to control the at least one second camera module (e.g., the camera modules 255 and 256 of FIG. 2 or the camera modules 415 and 416 of FIGS. 4A and 4B) to obtain image frames. The turning on and turning off a camera module may be expressed by, for example, an active state or an inactive state. For example, an active state of a camera module may indicate a state where the camera module obtains an image frame in a turn-on state. For example, an inactive state of a camera module may indicate a state where the camera module does not obtain an image frame in a turn-on state. A turn-on state of a camera module in the disclosure may be expressed by an active state or replaced by an active state. A turn-off state of a camera module in the disclosure may be expressed by an inactive state or replaced by an inactive state. The user's hand is positioned within the designated area of the first FOV, and thus there is a possibility that the user's hand may move to the second FOV. Therefore, the at least one second camera module (e.g., the camera modules 255 and 256 of FIG. 2 or the camera modules 415 and 416 of FIGS. 4A and 4B) is required to be turned on. This is because tracking of the user's hand may fail if the user's hand moves out of the first FOV in a state where the at least one second camera module (e.g., the camera modules 255 and 256 of FIG. 2 or the camera modules 415 and 416 of FIGS. 4A and 4B) has been turned off. The electronic device 101 may recognize and/or track an object, based on image frames obtained from the at least one second camera module (e.g., the camera modules 255 and 256 of FIG. 2 or the camera modules 415 and 416 of FIGS. 4A and 4B). In an example, the electronic device 101 may control the at least one second camera module (e.g., the camera modules 255 and 256 of FIG. 2 or the camera modules 415 and 416 of FIGS. 4A and 4B) to capture image frames at a relatively small frame rate, and in this case, may perform recognition using image frames captured by the at least one second camera module (e.g., the camera modules 255 and 256 of FIG. 2 or the camera modules 415 and 416 of FIGS. 4A and 4B). This will be described with reference to FIG. 6A. The above example is illustrative, and the electronic device 101 may also control the at least one second camera module (e.g., the camera modules 255 and 256 of FIG. 2 or the camera modules 415 and 416 of FIGS. 4A and 4B) to capture image frames at a relatively high frame rate, and in this case, may perform both recognition and/or tracking by using image frames captured by the at least one second camera module (e.g., the camera modules 255 and 256 of FIG. 2 or the camera modules 415 and 416 of FIGS. 4A and 4B). For example, in a case where recognition and/or tracking of an image is performed, recognition and/or tracking may be performed for each of an image captured by the at least one first camera module (e.g., the camera modules 253 and 254 of FIG. 2 or the camera modules 413 and 414 of FIGS. 4A and 4B) and an image captured by the at least one second camera module (e.g., the camera modules 255 and 256 of FIG. 2 or the camera modules 415 and 416 of FIGS. 4A and 4B). Alternatively, for example, recognition and/or tracking may be performed for an image obtained by synthesizing an image captured by the at least one first camera module (e.g., the camera modules 253 and 254 of FIG. 2 or the camera modules 413 and 414 of FIGS. 4A and 4B) and an image captured by the at least one second camera module (e.g., the camera modules 255 and 256 of FIG. 2 or the camera modules 415 and 416 of FIGS. 4A and 4B). There is no limit to the method of recognizing and/or tracking images captured by multiple camera modules.

Although not illustrated, after the at least one second camera module (e.g., the camera modules 255 and 256 of FIG. 2 or the camera modules 415 and 416 of FIGS. 4A and 4B) is turned on according to the user's hand 551 being disposed within the designated area of the first FOV, the user's hand 551 may move again to a remaining area except for the designated area from the first FOV. The electronic device 101 may track an object corresponding to the user's hand 551 by using image frames corresponding to the first FOV, and may identify, from a result of the tracking, that the user's hand 551 has moved to the remaining area except for the designated area 561 from the image 560. In this case, the electronic device 101 may turn off again the at least one second camera module (e.g., the camera modules 255 and 256 of FIG. 2 or the camera modules 415 and 416 of FIGS. 4A and 4B). For example, for a hysteresis characteristic, the at least one second camera module (e.g., the camera modules 255 and 256 of FIG. 2 or the camera modules 415 and 416 of FIGS. 4A and 4B) may be configured to be turned off again when an object corresponding to the hand 551 moves out of a wider area including the first area 561. For example, even if the object corresponding to the user's hand 551 moves out of the first area 561, the electronic device 101 maintains a turn-on state of the at least one second camera module (e.g., the camera modules 255 and 256 of FIG. 2 or the camera modules 415 and 416 of FIGS. 4A and 4B) for a predetermined period. Based on that the object moving into the first area 561 back is not identified, the electronic device may turn off the at least one second camera module (e.g., the camera modules 255 and 256 of FIG. 2 or the camera modules 415 and 416 of FIGS. 4A and 4B, and the above operations are illustrative and thus there is no limit.

Operation 505 of turning on the at least one second camera module (e.g., the camera modules 255 and 256 of FIG. 2 or the camera modules 415 and 416 of FIGS. 4A and 4B) and controlling the at least one second camera module (e.g., the camera modules 255 and 256 of FIG. 2 or the camera modules 415 and 416 of FIGS. 4A and 4B) to obtain image frames merely corresponds to an example. In another embodiment, even before operation 503, the at least one second camera module (e.g., the camera modules 255 and 256 of FIG. 2 or the camera modules 415 and 416 of FIGS. 4A and 4B) may be turned on. The electronic device 101 may, in replacement of operation 505, control the at least one second camera module (e.g., the camera modules 255 and 256 of FIG. 2 or the camera modules 415 and 416 of FIGS. 4A and 4B) to increase the frame rate of the at least one second camera module (e.g., the camera modules 255 and 256 of FIG. 2 or the camera modules 415 and 416 of FIGS. 4A and 4B).

Figure 5C:
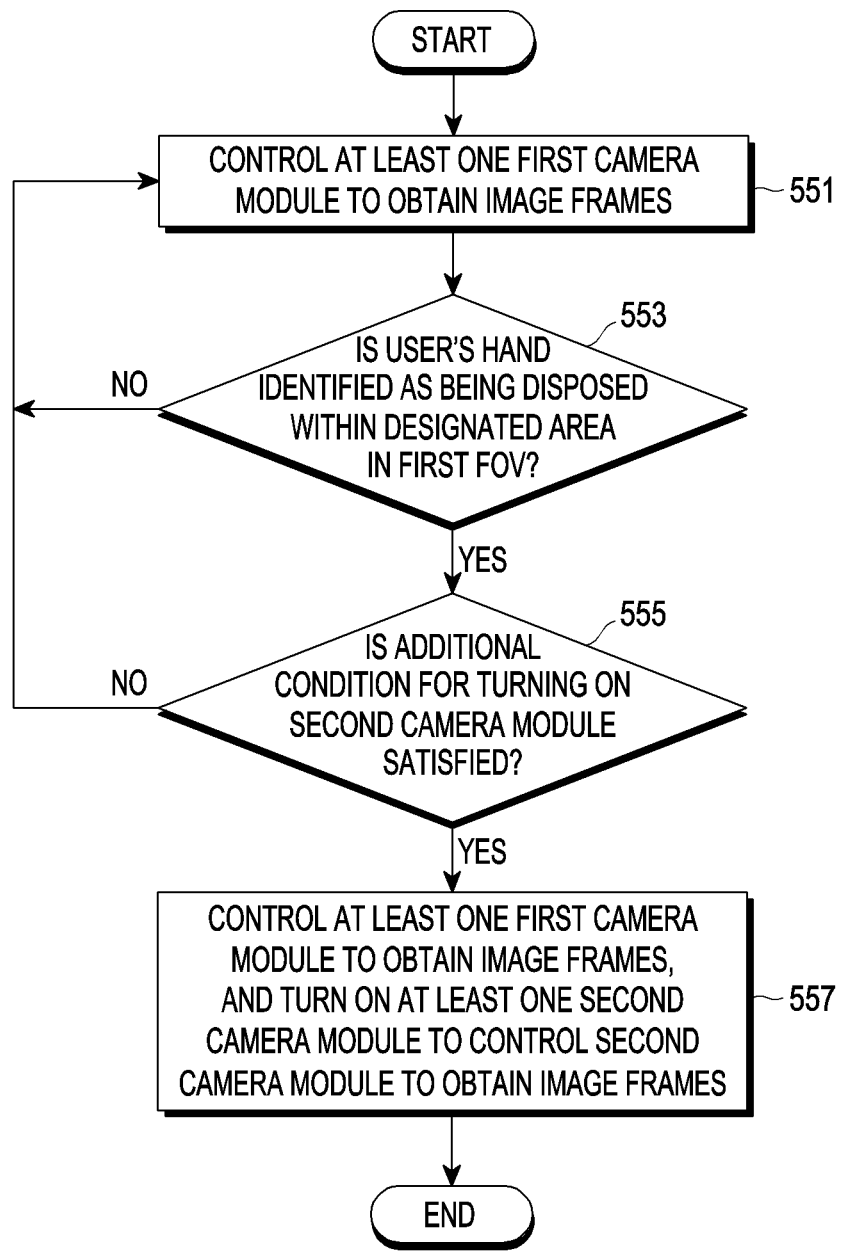
FIG. 5C is a flowchart illustrating an operation of operating an electronic device according to an embodiment of the disclosure.

FIG. 5C is a flowchart illustrating a method of operating an electronic device according to an embodiment of the disclosure.

Referring to FIG. 5C, according to an embodiment, the electronic device 101 (e.g., the processor 120) may, in operation 551, control at least one first camera module (e.g., the camera modules 253 and 254 of FIG. 2 or the camera modules 413 and 414 of FIGS. 4A and 4B) to obtain image frames. The electronic device 101 may, in operation 553, identify whether a user's hand is disposed within a designated area in a first FOV. When it is identified that the user's hand is disposed within the designated area of the first FOV (operation 553—Yes), the electronic device 101 may, in operation 555, identify whether an additional condition for turning on a second camera module is satisfied. If it is identified that the additional condition is satisfied (operation 555—YES), the electronic device 101 may, in operation 557, control the at least one first camera module (e.g., the camera modules 253 and 254 of FIG. 2 or the camera modules 413 and 414 of FIGS. 4A and 4B) to obtain image frames, and turn on the at least one second camera module (e.g., the camera modules 255 and 256 of FIG. 2 or the camera modules 415 and 416 of FIGS. 4A and 4B) to control the second camera module (e.g., the camera modules 255 and 256 of FIG. 2 or the camera modules 415 and 416 of FIGS. 4A and 4B) to obtain image frames.

In an example, the electronic device 101 may identify whether an application requiring recognition and/or tracking of a particular type of an object (e.g., an object corresponding to the hand) is executed, as whether the additional condition is satisfied. If the application requiring recognition and/or tracking of an object (e.g., an object corresponding to the hand) is not executed, turning on the at least one second camera module (e.g., the camera modules 255 and 256 of FIG. 2 or the camera modules 415 and 416 of FIGS. 4A and 4B) to additionally recognize and/or track a particular type of an object (e.g., an object corresponding to the hand) may not be required. In this case, even if it is identified that the hand is disposed in a particular area of the first FOV, the electronic device 101 may maintain a turn-off state of the at least one second camera module (e.g., the camera modules 255 and 256 of FIG. 2 or the camera modules 415 and 416 of FIGS. 4A and 4B).

In an example, the electronic device 101 may identify whether a function associated with recognition and/or tracking of a particular type of an object (e.g., an object corresponding to the hand) is called (e.g., this corresponds to whether a visual object associated with recognition and/or tracking is displayed, but there is not limited), as whether the additional condition is satisfied. For example, as the function associated with recognition and/or tracking, a virtual keyboard operating based on recognition and/or tracking of a hand may be provided. For example, as the function associated with recognition and/or tracking, a control function based on recognition and/or tracking of a hand may be called (or executed), but there is no limit to the called function. If the function associated with recognition and/or tracking of a particular type of an object (e.g., an object corresponding to the hand) is not executed, turning on the at least one second camera module (e.g., the camera modules 255 and 256 of FIG. 2 or the camera modules 415 and 416 of FIGS. 4A and 4B) to additionally recognize and/or track a particular type of an object (e.g., an object corresponding to the hand) may not be required. In this case, even if it is identified that the hand is disposed in a particular area of the first FOV, the electronic device 101 may maintain a turn-off state of the at least one second camera module (e.g., the camera modules 255 and 256 of FIG. 2 or the camera modules 415 and 416 of FIGS. 4A and 4B).

In an example, the electronic device 101 may identify whether the position of a virtual object (e.g., a virtual keyboard) associated with recognition and/or tracking of a particular type of an object (e.g., an object corresponding to the hand) is included in a designated area, as whether the additional condition is satisfied. For example, if the position of the virtual object (e.g., a virtual keyboard) associated with recognition and/or tracking is at the relatively upper side, the user may be more likely to position the hand at the relatively upper side in order to manipulate the virtual object positioned at the upper side, and may be less likely to position the hand at the relatively lower side. If the position of the virtual object (e.g., a virtual keyboard) associated with recognition and/or tracking of a particular type of an object (e.g., an object corresponding to the hand) is not included in a designated area (e.g., an area corresponding to the at least one second camera module (e.g., the camera modules 255 and 256 of FIG. 2 or the camera modules 415 and 416 of FIGS. 4A and 4B)), turning on the at least one second camera module (e.g., the camera modules 255 and 256 of FIG. 2 or the camera modules 415 and 416 of FIGS. 4A and 4B) to additionally recognize and/or track a particular type of an object (e.g., an object corresponding to the hand) may not be required. In this case, even if it is identified that the hand is disposed in a particular area of the first FOV, the electronic device 101 may maintain a turn-off state of the at least one second camera module (e.g., the camera modules 255 and 256 of FIG. 2 or the camera modules 415 and 416 of FIGS. 4A and 4B). The above additional conditions merely correspond to an example, and may be configured in association with the state of the electronic device 101, such as whether the state is a low-power state or whether the state is an overtemperature state, and a person who skilled in the art will understand that there is no limit. Furthermore, a person who skilled in the art would understand that the at least one second camera module (e.g., the camera modules 255 and 256 of FIG. 2 or the camera modules 415 and 416 of FIGS. 4A and 4B) may also be configured to be immediately turned on, without considering whether the additional condition is satisfied, if it is identified that the hand is disposed in a particular area of the first FOV.

Figure 6A:
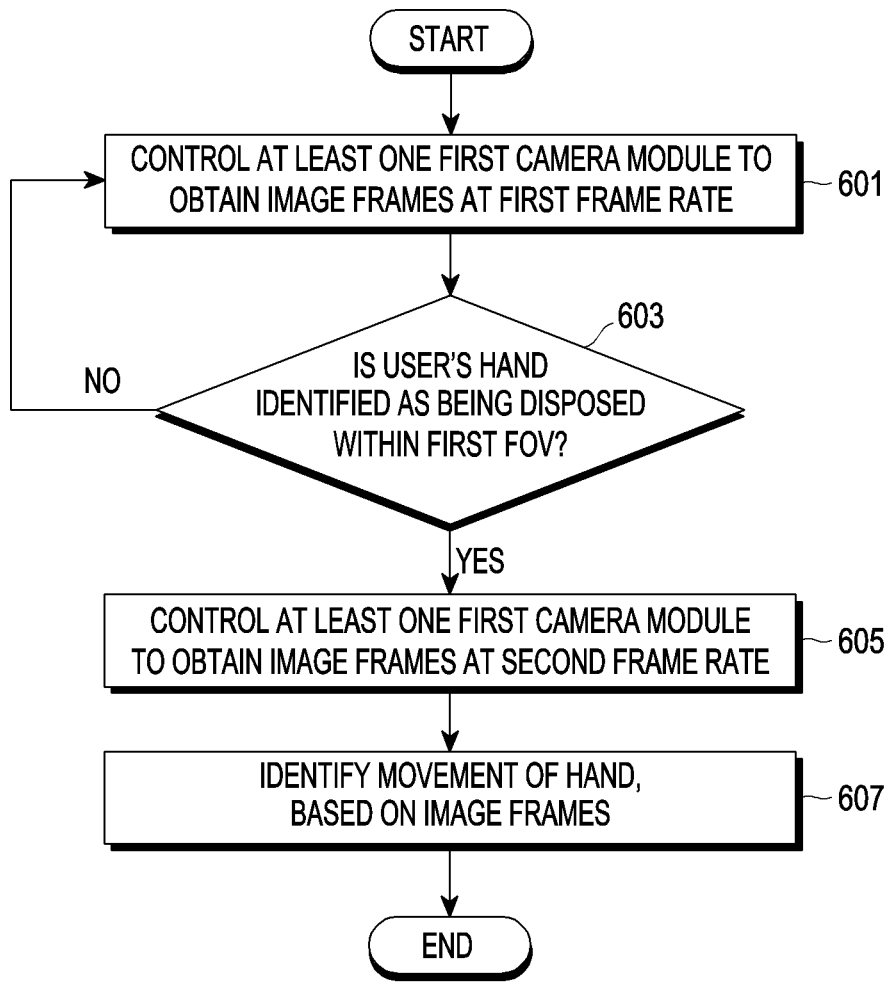
FIG. 6A is a flowchart illustrating a method of operating an electronic device according to an embodiment of the disclosure.
Figure 6B:
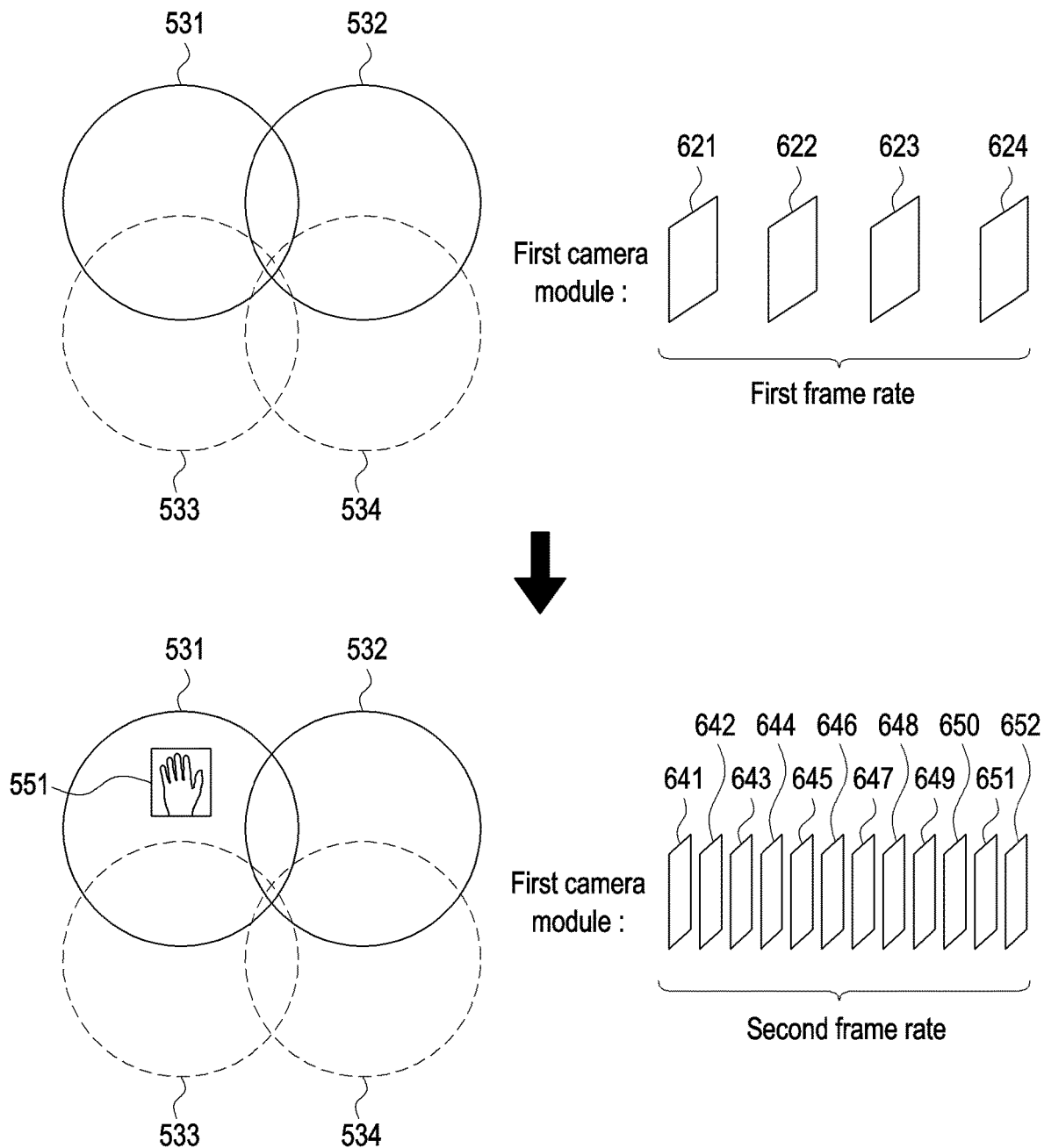
FIG. 6B is a diagram illustrating adjustment of a frame rate of at least one first camera module according to an embodiment of the disclosure.

FIG. 6A is a flowchart illustrating a method of operating an electronic device according to an embodiment of the disclosure. An embodiment of FIG. 6A will be described with reference to FIG. 6B. FIG. 6B is a diagram illustrating adjustment of the frame rate of at least one first camera module according to an embodiment of the disclosure.

Referring to FIGS. 6A and 6B, according to an embodiment, the electronic device 101 (e.g., the processor 120) may, in operation 601, control at least one first camera module (e.g., the camera modules 253 and 254 of FIG. 2 or the camera modules 413 and 414 of FIGS. 4A and 4B) to obtain image frames 621, 622, 623, and 624 at a first frame rate. For convenience of explanation, the image frames 621, 622, 623, and 624 having the first frame rate corresponding to one camera module have been illustrated in FIG. 6B. However, a person who skilled in the art will understand that a camera module (e.g., the camera module 253 of FIG. 2 or the camera module 413 of FIGS. 4A and 4B) corresponding to the first sub FOV 531 obtains image frames, and a camera module (e.g., the camera module 254 of FIG. 2 or the camera module 414 of FIGS. 4A and 4B) corresponding to the second sub FOV 532 obtains image frames. The first frame rate may be a relatively low value (e.g., 30 fps). The first frame rate having a relatively low value may be a numerical value for, for example, 6DoF, SLAM, and/or head tracking, but there is no limit. The power and/or resources required for a camera module obtaining image frames at the first frame rate having a relatively low value may be relatively small. For example, the first frame rate may be configured to be a numerical value which is relatively low but is sufficient to enable recognition of a particular object (e.g., an object corresponding to a hand).

According to an embodiment, the electronic device 101 may, in operation 603, identify whether a user's hand is disposed within a first FOV. The electronic device 101 may identify whether the hand is disposed, based on a result of recognition of the image frames 621, 622, 623, and 624. In order to prevent increment of the frame rate caused by unintentional hand recognition, the electronic device 101 may be configured to perform a subsequent operation, based on recognition of a special shape (e.g., the left palm and/or the back of the right hand, but no limitation) of a hand and/or a designated gesture associated with a hand. As described above, for example, the first frame rate may be configured to be a numerical value which is relatively low but is sufficient to enable recognition of a particular object (e.g., an object corresponding to a hand), and accordingly, whether the hand is disposed may be identified based on a result of recognition of the image frames 621, 622, 623, and 624. If it is identified that the user's hand 551 is disposed within the first FOV (operation 603—Yes), the electronic device 101 may, in operation 605, control the at least one first camera module (e.g., the camera modules 253 and 254 of FIG. 2 or the camera modules 413 and 414 of FIGS. 4A and 4B) to obtain image frames 641, 642, 643, 644, 645, 646, 647, 648, 649, 650, 651, and 652 at a second frame rate. The electronic device 101 may, in operation 607, identify a movement of the hand, based on the image frames 641, 642, 643, 644, 645, 646, 647, 648, 649, 650, 651, and 652. The second frame rate may be a numerical value (e.g., 90 fps) relatively higher than the first frame rate. The power and/or resources required for a camera module obtaining image frames at the first frame rate having a relatively low value may be relatively small. However, there may be a higher possibility of failure of object tracking in a case of obtaining image frames at the first frame rate. It may be possible to track a user's hand even at the first frame rate when the hand moves at a relatively low speed. However, a case where a user's hand moves at a relatively high speed may have a possibility that tracking of the hand based on the first frame rate may fail. Therefore, in order to lower the possibility of tracking failure, an image frame may be obtained at the second frame rate that is relatively high. The second frame rate may be, for example, a numerical value sufficient to enable tracking of a hand, but there is no limit. Accordingly, the electronic device 101 may, after identifying the hand 551 being disposed, increase the frame rate of the at least one first camera module (e.g., the camera modules 253 and 254 of FIG. 2 or the camera modules 413 and 414 of FIGS. 4A and 4B) from the first frame rate to the second frame rate. The electronic device 101 may track the hand 551 by using the image frames 641, 642, 643, 644, 645, 646, 647, 648, 649, 650, 651, and 652 obtained at the second frame rate that is a relatively high value. The electronic device 101 may perform an operation based on a result of tracking. In an embodiment of FIG. 6B, the at least one second camera module (e.g., the camera modules 255 and 256 of FIG. 2 or the camera modules 415 and 416 of FIGS. 4A and 4B) has been illustrated as being turned off, but this is an example, and a person who skilled in the art will understand that same may be turned on in some cases. In an embodiment, in a state where the at least one first camera module (e.g., the camera modules 253 and 254 of FIG. 2 or the camera modules 413 and 414 of FIGS. 4A and 4B) and the at least one second camera module (e.g., the camera modules 255 and 256 of FIG. 2 or the camera modules 415 and 416 of FIGS. 4A and 4B) have both been turned on, image frames may be obtained at the first frame rate. In this case, based on identification that the user's hand 551 is disposed within the first FOV, the electronic device 101 may, in order to track the hand 551, change the frame rate of the at least one first camera module (e.g., the camera modules 253 and 254 of FIG. 2 or the camera modules 413 and 414 of FIGS. 4A and 4B) from the first frame rate to the second frame rate. If the hand 551 is detected in an area (e.g., the area 561) in which the first sub FOV 531 and the third sub FOV 533 overlap with each other, the electronic device 101 may change the frame rate of the at least one second camera module (e.g., the camera modules 255 and 256 of FIG. 2 or the camera modules 415 and 416 of FIGS. 4A and 4B) from the first frame rate to the second frame rate.

While the at least one second camera module (e.g., the camera modules 255 and 256 of FIG. 2 or the camera modules 415 and 416 of FIGS. 4A and 4B) is obtaining image frames at the first frame rate, the electronic device 101 according to an embodiment may change the frame rate of the at least one second camera module (e.g., the camera modules 255 and 256 of FIG. 2 or the camera modules 415 and 416 of FIGS. 4A and 4B) from the first frame rate to the second frame rate, based on detection of the user's hand 551 in a second FOV. The electronic device 101 may track the hand 551, based on image frames obtained by the at least one second camera module (e.g., the camera modules 255 and 256 of FIG. 2 or the camera modules 415 and 416 of FIGS. 4A and 4B) at the second frame rate.

The electronic device 101 according to an embodiment may control the at least one first camera module (e.g., the camera modules 253 and 254 of FIG. 2 or the camera modules 413 and 414 of FIGS. 4A and 4B) and the at least one second camera module (e.g., the camera modules 255 and 256 of FIG. 1 or the camera modules 415 and 416 of FIGS. 4A and 4B) to obtain an image frame at the first frame rate. For example, if the hand 551 is detected in the first area 561, the electronic device 101 may change the frame rate of the at least one second camera module (e.g., the camera modules 255 and 256 of FIG. 2 or the camera modules 415 and 416 of FIGS. 4A and 4B) from the first frame rate to the second frame rate. Alternatively, in another example, the electronic device 101 may be configured to, if the hand 551 is detected in the first area 561, maintain the frame rate of the at least one second camera module (e.g., the camera modules 255 and 256 of FIG. 2 or the camera modules 415 and 416 of FIGS. 4A and 4B) at the first frame rate. In this case, the electronic device 101 may identify that the hand is disposed in a designated area of the second FOV (or the hand has moved out of the first FOV), and change the frame rate of the at least one second camera module (e.g., the camera modules 255 and 256 of FIG. 2 or the camera modules 415 and 416 of FIGS. 4A and 4B) from the first frame rate to the second frame rate. The electronic device 101 may identify that the hand is disposed in the designated area of the second FOV (or the hand has moved out of the first FOV), and control the at least one first camera module (e.g., the camera modules 253 and 254 of FIG. 2) to operate at the first frame rate. For example, before it is identified that the hand is disposed in the designated area of the second FOV (or the hand has moved out of the first FOV), the frame rate of the at least one first camera module (e.g., the camera modules 253 and 254 of FIG. 2) may be the second frame rate. In this case, based on identification that the hand is disposed in the designated area of the second FOV (or the hand has moved out of the first FOV), the frame rate of the at least one first camera module (e.g., the camera modules 253 and 254 of FIG. 2) may be changed from the second frame rate to the first frame rate.

Figure 6C:
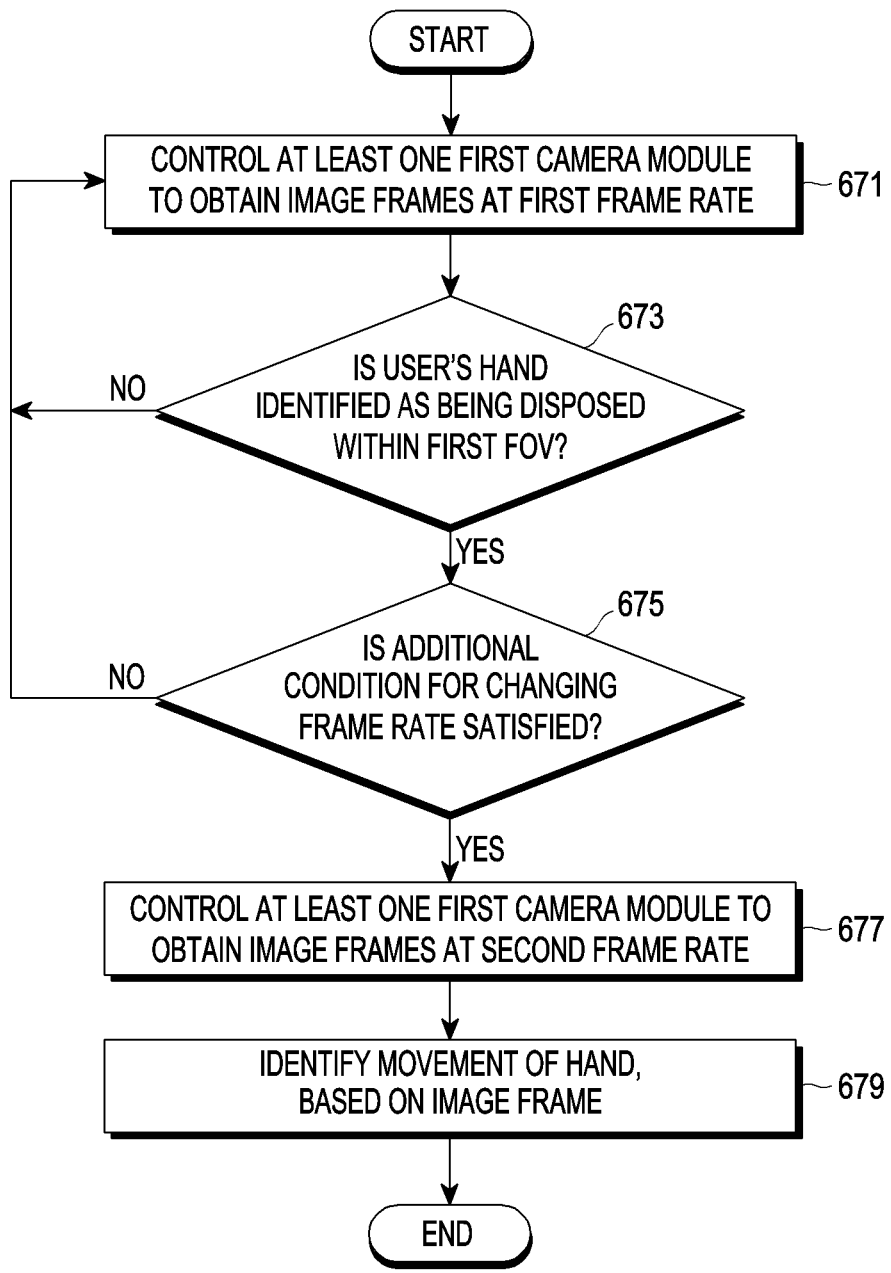
FIG. 6C is a flowchart illustrating a method of operating an electronic device according to an embodiment of the disclosure.

FIG. 6C is a flowchart illustrating a method of operating an electronic device according to an embodiment of the disclosure.

According to an embodiment, the electronic device 101 (e.g., the processor 120) may, in operation 671, control at least one first camera module (e.g., the camera modules 253 and 254 of FIG. 2 or the camera modules 413 and 414 of FIGS. 4A and 4B) to obtain image frames at a first frame rate. The electronic device 101 may, in operation 673, identify whether a user's hand is disposed within a first FOV. If it is identified that the user's hand is disposed within the first FOV (operation 673—Yes), the electronic device 101 may, in operation 675, identify whether an additional condition for changing the frame rate is satisfied. If it is identified that the additional condition is satisfied (operation 673—Yes), the electronic device 101 may, in operation 677, control the at least one first camera module (e.g., the camera modules 253 and 254 of FIG. 2 or the camera modules 413 and 414 of FIGS. 4A and 4B) to obtain image frames at a second frame rate. The electronic device 101 may, in operation 679, identify a movement of the hand, based on an image frame. For example, the additional condition may be a call of a function for tracking a hand, and there is no limit. For example, as the additional condition, if a virtual object (e.g., a virtual keyboard) for tracking a hand is displayed, the electronic device 101 may change the frame rate. If the virtual object (e.g., a virtual keyboard) for tracking a hand is not displayed, the electronic device 101 may maintain the frame rate of the at least one first camera module (e.g., the camera modules 253 and 254 of FIG. 2 or the camera modules 413 and 414 of FIGS. 4A and 4B) even when the hand has been recognized.

Figure 7A:
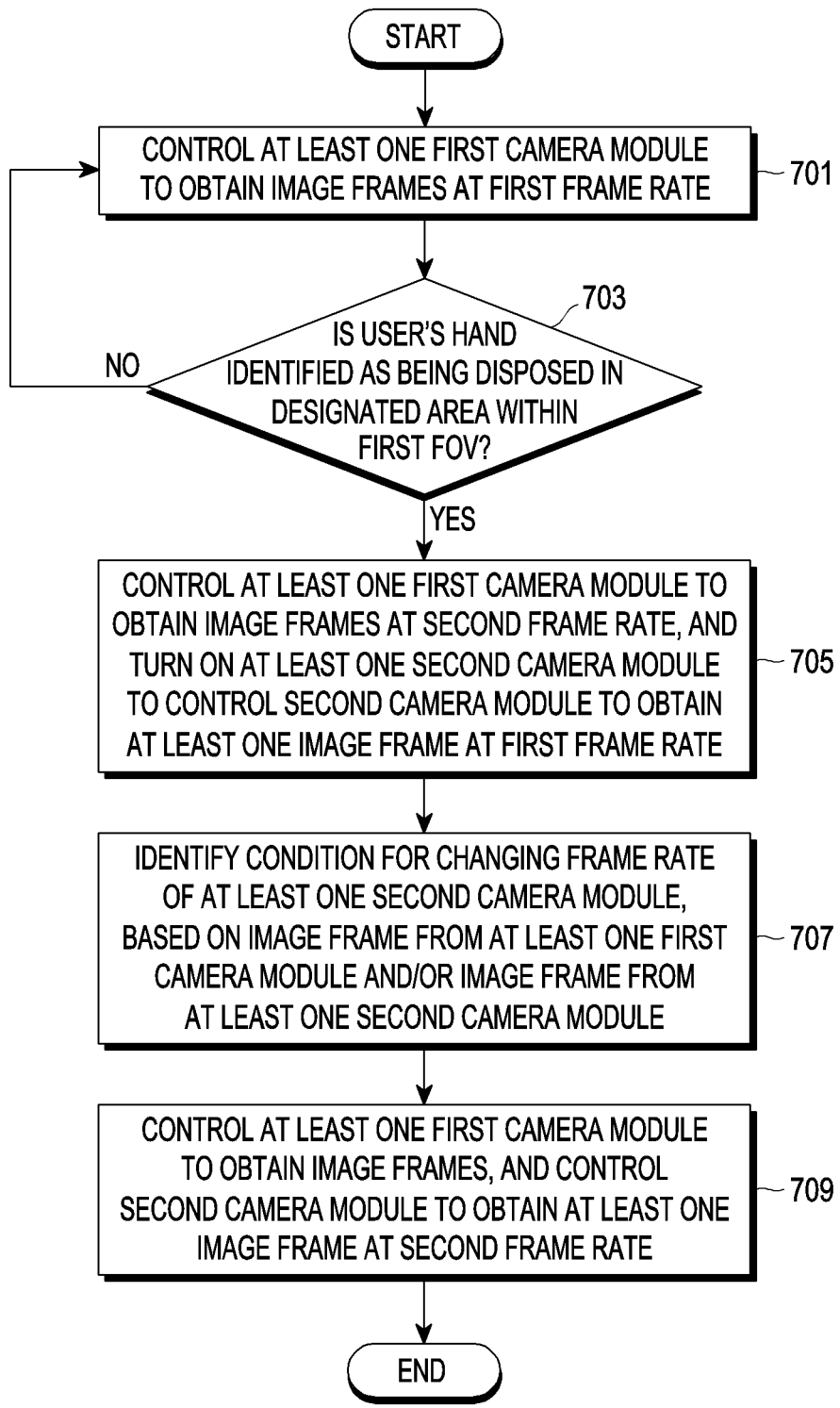
FIG. 7A is a flowchart illustrating a method of operating an electronic device according to an embodiment of the disclosure.
Figure 7B:
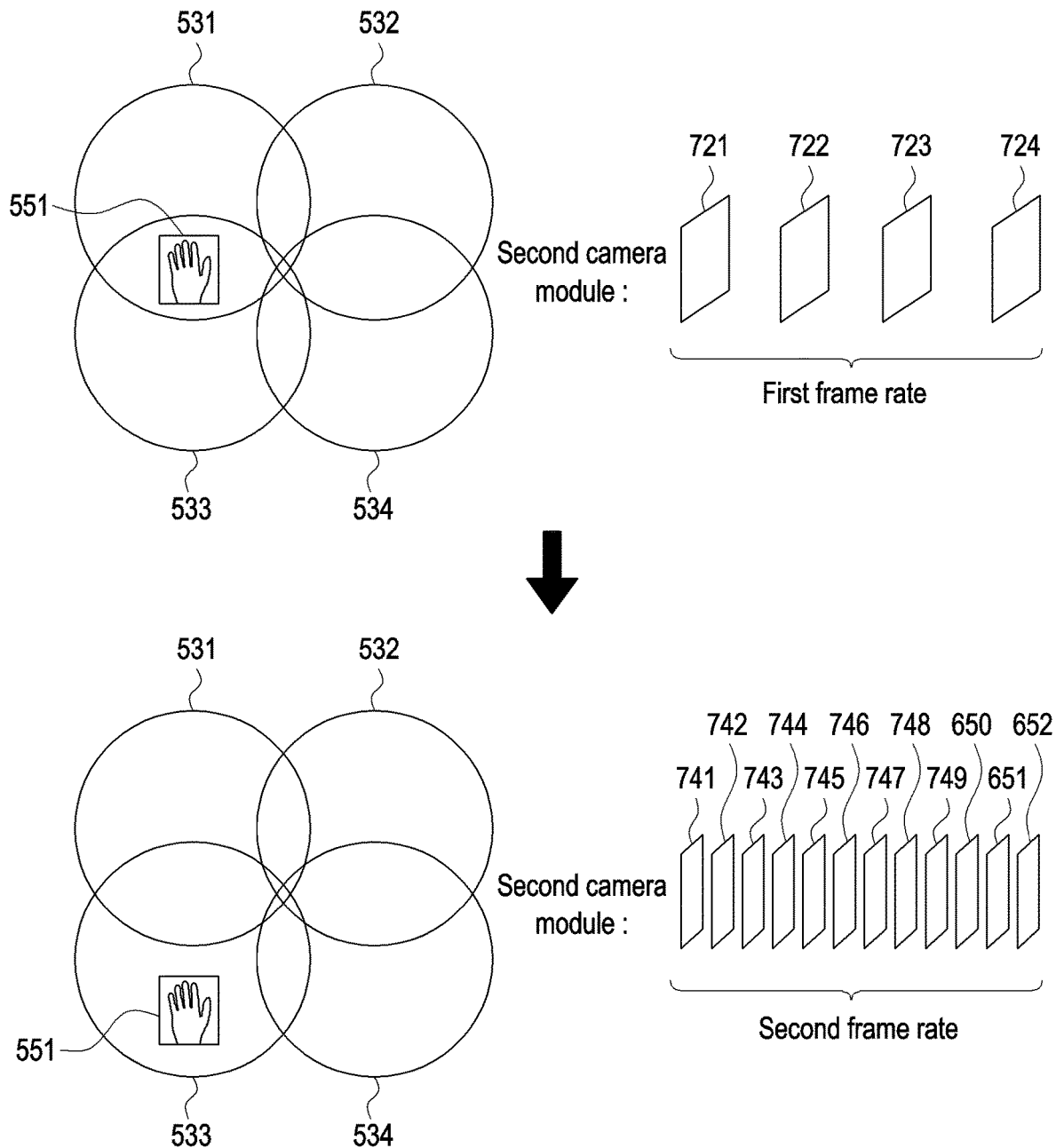
FIG. 7B is a diagram illustrating adjustment of a frame rate of at least one second camera module according to an embodiment of the disclosure.

FIG. 7A is a flowchart illustrating a method of operating an electronic device according to an embodiment of the disclosure. An embodiment of FIG. 7A will be described with reference to FIG. 7B. FIG. 7B is a diagram illustrating adjustment of the frame rate of at least one second camera module according to an embodiment of the disclosure.

According to an embodiment, the electronic device 101 (e.g., the processor 120) may, in operation 701, control at least one first camera module (e.g., the camera modules 253 and 254 of FIG. 2 or the camera modules 413 and 414 of FIGS. 4A and 4B) to obtain image frames at a first frame rate. The electronic device 101 may, in operation 703, identify whether a user's hand is disposed within a first FOV. If it is identified that the user's hand is disposed within the first FOV (operation 703—YES), the electronic device 101 may, in operation 705, control the at least one first camera module (e.g., the camera modules 253 and 254 of FIG. 2 or the camera modules 413 and 414 of FIGS. 4A and 4B) to obtain image frames at a second frame rate greater than the first frame rate, and turn on the at least one second camera module (e.g., the camera modules 255 and 256 of FIG. 2 or the camera modules 415 and 416 of FIGS. 4A and 4B) to control the second camera module (e.g., the camera modules 255 and 256 of FIG. 2 or the camera modules 415 and 416 of FIGS. 4A and 4B) to obtain at least one image frame 721, 722, 723, and 724 of FIG. 7B at the first frame rate. For example, the first frame rate may be a relatively low value (e.g., 30 fps), and the second frame rate may be a relatively high value (e.g., 90 fps). The power and/or resources required for a camera module obtaining image frames at the first frame rate having a relatively low value may be relatively small. For example, the first frame rate may be configured to be a numerical value which is relatively low but is sufficient to enable recognition of a particular object (e.g., an object corresponding to a hand).

According to an embodiment, the electronic device 101 may, in operation 707, identify that a condition for changing the frame rate of the at least one second camera module (e.g., the camera modules 255 and 256 of FIG. 2 or the camera modules 415 and 416 of FIGS. 4A and 4B) is satisfied, based on an image frame from the at least one first camera module (e.g., the camera modules 253 and 254 of FIG. 2 or the camera modules 413 and 414 of FIGS. 4A and 4B) and/or an image frame from the at least one second camera module (e.g., the camera modules 255 and 256 of FIG. 2 or the camera modules 415 and 416 of FIGS. 4A and 4B). The condition for changing the frame rate may correspond to, for example, whether the user's hand is detected in a designated area (e.g., a relatively lower area in a second FOV, but no limitation) in the second FOV, as illustrated in FIG. 7B, but there is no limit Based on satisfaction of the condition for changing the frame rate, the electronic device 101 may, in operation 709, control the at least one first camera module (e.g., the camera modules 253 and 254 of FIG. 2 or the camera modules 413 and 414 of FIGS. 4A and 4B) to obtain image frames, and control the at least one second camera module (e.g., the camera modules 255 and 256 of FIG. 2 or the camera modules 415 and 416 of FIGS. 4A and 4B) to obtain at least one image frame 741, 742, 743, 744, 745, 746, 747, 748, 749, 750, 751, and 752 of FIG. 7B at the second frame rate. Alternatively, based on that the user's hand is detected in the designated area of the second FOV and an additional condition for changing the frame rate is satisfied, the electronic device 101 may adjust the frame rate of the at least one second camera module (e.g., the camera modules 255 and 256 of FIG. 2 or the camera modules 415 and 416 of FIGS. 4A and 4B) from the first frame rate to the second frame rate. The electronic device 101 may track the user's hand 551, based on an image frame obtained by the at least one second camera module (e.g., the camera modules 255 and 256 of FIG. or the camera modules 415 and 416 of FIGS. 4A and 4B) at the second frame rate. As described above, the at least one second camera module (e.g., the camera modules 255 and 256 of FIG. or the camera modules 415 and 416 of FIGS. 4A and 4B) may obtain an image frame at the relatively low first frame rate at a turn-on time point, and then when the user's hand 551 has moved to the relatively lower side, the frame rate of the at least one second camera module (e.g., the camera modules 255 and 256 of FIG. or the camera modules 415 and 416 of FIGS. 4A and 4B) may be increased to the second frame rate.

According to an embodiment, based on adjusting the frame rate of the at least one second camera module (e.g., the camera modules 255 and 256 of FIG. 2 or the camera modules 415 and 416 of FIGS. 4A and 4B) to the second frame rate, the electronic device 101 may change the frame rate of the at least one first camera module (e.g., the camera modules 253 and 254 of FIG. 2 or the camera modules 413 and 414 of FIGS. 4A and 4B) from the second frame rate to the first frame rate. The electronic device 101 may track a target object by using an image frame obtained by the at least one second camera module (e.g., the camera modules 255 and 256 of FIG. 2 or the camera modules 415 and 416 of FIGS. 4A and 4B), and thus adjust the frame rate of the at least one first camera module (e.g., the camera modules 253 and 254 of FIG. 2 or the camera modules 413 and 414 of FIGS. 4A and 4B) from the second frame rate to the first frame rate. The above description is an example, and the electronic device 101 may maintain, at the second frame rate, the frame rate of the at least one first camera module (e.g., the camera modules 253 and 254 of FIG. 2 or the camera modules 413 and 414 of FIGS. 4A and 4B).

Figure 8:
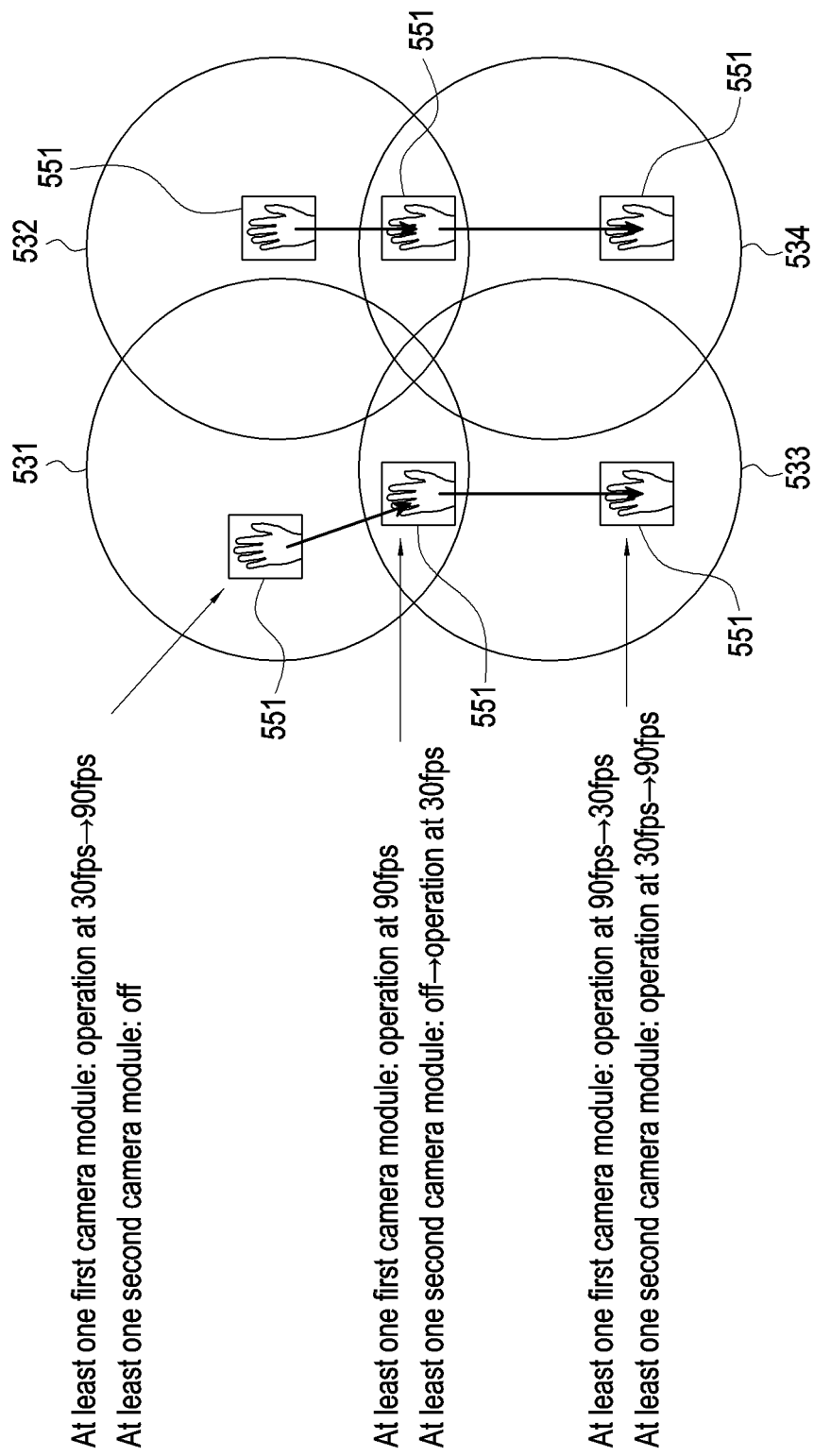
FIG. 8 is a diagram illustrating adjustment of a FOV and a frame rate of an electronic device of AR glasses according to an embodiment of the disclosure.

FIG. 8 is a diagram illustrating adjustment of the FOV and the frame rate of an electronic device of AR glasses according to an embodiment of the disclosure.

According to an embodiment, the electronic device 200 of AR glasses may identify that the user's hand 551 is positioned in the first sub FOV 531 at a first time point. For example, the electronic device 200 may control at least one first camera module (e.g., the camera modules 253 and 254 of FIG. 2) to obtain an image frame at a first frame rate. The electronic device 200 may identify that the user's hand 551 is positioned in the first sub FOV 531, based on the image frame obtained by the least one first camera module (e.g., the camera modules 253 and 254 of FIG. 2). The electronic device 200 may adjust the frame rate of the least one first camera module (e.g., the camera modules 253 and 254 of FIG. 2) from the first frame rate (e.g., 30 fps) to a second frame rate (e.g., 90 fps), based on the hand 551 being recognized in the first sub FOV 531 that is a part of a first FOV. The electronic device 200 may track the hand 551, based on an image frame captured at the second frame rate. At least one second camera module (e.g., the camera modules 255 and 256 in FIG. 2) may maintain a turn-off state.

At a second time point, the user's hand 551 may move to an area (e.g., a designated area of the first FOV) in which the first sub FOV 531 and the third sub FOV 533 overlap with each other. The electronic device 200 may turn on the at least one second camera module (e.g., the camera modules 255 and 256 in FIG. 2), based on the hand 551 being positioned in the designated area of the first FOV. The electronic device 200 may control the at least one second camera module (e.g., the camera modules 255 and 256 in FIG. 2) to obtain an image frame at the first frame rate (e.g., 30 fps).

At a third time point, the user's hand 551 may move to a designated area of the third sub FOV 533. For example, the electronic device 200 may identify that the hand 551 has moved out of the designated area of the first FOV, based on the image frame obtained by the least one first camera module (e.g., the camera modules 253 and 254 of FIG. 2). For example, the electronic device 200 may identify that the user's hand 551 is positioned in a designated area of a second FOV, based on the image frame obtained by the at least one second camera module (e.g., the camera modules 255 and 256 in FIG. 2). For example, the electronic device 200 may identify that the user's hand 551 is positioned in the designated area of the second FOV, based on an image by a synthesis image obtained by synthesizing an image obtained by the least one first camera module (e.g., the camera modules 253 and 254 of FIG. 2) and an image obtained by the at least one second camera module (e.g., the camera modules 255 and 256 in FIG. 2), and there is no limit to the method of identifying whether the user's hand 551 is positioned in the designated area of the second FOV. Based on the user's hand 551 being disposed in the designated area of the third sub FOV 533, the electronic device 200 may adjust the frame rate of the at least one first camera module (e.g., the camera modules 253 and 254 of FIG. 2) from the second frame rate to the first frame rate, and adjust the frame rate of the at least one second camera module (e.g., the camera modules 255 and 256 in FIG. 2) from the first frame rate to the second frame rate. The electronic device 101 may track the hand 551, based on the image frame obtained by the at least one second camera module (e.g., the camera modules 255 and 256 in FIG. 2).

As illustrated in FIG. 8, the hand 551 may be positioned in the second sub FOV 532 at the first time point, move to a designated area of the second sub FOV 532 at the second time point, and then move to the fourth sub FOV 534 at the third time point. Alternatively, although not illustrated, the hand 551 may be positioned in the second sub FOV 532 at the first time point, move to the designated area of the second sub FOV 532 at the second time point, and then move to the third sub FOV 533 at the third time point. Alternatively, although not illustrated, the hand 551 may be positioned in the second sub FOV 532 at the first time point, move to the designated area of the first sub FOV 531 at the second time point, and then move to the third sub FOV 533 at the third time point. As described above, the second sub FOV 532 may correspond to the first FOV together with the first sub FOV 531, and the fourth sub FOV 534 may correspond to the second FOV together with the third sub FOV 533. An operation based on recognition and/or tracking for the second sub FOV 532 may be at least partially the same as an operation based on recognition and/or tracking for the first sub FOV 531. An operation based on recognition and/or tracking for the designated area (e.g., a relatively lower area) of the second sub FOV 532 may be at least partially the same as an operation based on recognition and/or tracking for the designated area (e.g., a relatively lower area) of the first sub FOV 531. An operation based on recognition and/or tracking for the fourth sub FOV 534 may be at least partially the same as an operation based on recognition and/or tracking for the second sub FOV 532. An operation based on recognition and/or tracking for a designated area (e.g., a relatively upper area) of the fourth sub FOV 534 may be at least partially the same as an operation based on recognition and/or tracking for the designated area (e.g., a relatively upper area) of the second sub FOV 532. Accordingly, even in a case where the hand 551 moves along "the second sub FOV 532→the designated area of the second sub FOV 532→the fourth sub FOV 534", "the second sub FOV 532→the designated area of the second sub FOV 532→the third sub FOV 533", or "the second sub FOV 532→the designated area of the first sub FOV 531→the third sub FOV 533", the electronic device 101 may perform the operations corresponding to the first time point, the second time point, and the third time point described above with reference to FIG. 8. A person who skilled in the art will understand that the identity between the operations corresponding to the first sub FOV 531 and the second sub FOV 532 and/or the identity between the operations corresponding to the third sub FOV 533 and the fourth sub FOV 534 may be applied to other embodiments as well as this embodiment.

Although not illustrated, with reference to FIG. 8, an operation of the electronic device 101 for a case where the hand 551 moves from a relatively upper side to a relatively lower side has been described, but this merely corresponds to an example. For example, when a user puts the electronic device 101 on the head, the hand 551 to be tracked may be highly likely to be positioned relatively lower than the head. In a case where the hand 551 performs a particular operation (e.g., typing on a virtual keyboard) while being positioned at a relatively lower side, tracking of the hand 551 may be required to be performed at a relatively high frame rate. Accordingly, the operations of the electronic device 101 for a case where the hand 551 is positioned at a relatively lower side have been described.

However, an operation for a case where a target to be tracked is highly likely to be positioned relatively higher than the position on which the electronic device 101 is worn may also be possible. For example, with respect to a particular object, the electronic device 101 may adjust the frame rate of the at least one second camera module (e.g., the camera modules 255 and 256 of FIG. 2 or the camera modules 415 and 416 of FIGS. 4A and 4B), based on identification that the object is positioned in the second FOV at the first time point. For example, the electronic device 101 may turn on the at least one first camera module (e.g., the camera modules 253 and 254 of FIG. 2 or the camera modules 413 and 414 of FIGS. 4A and 4B), based on that the particular object has moved to the designated area (e.g., a relatively upper area) of the second FOV at the second time point. For example, the electronic device 101 may adjust the frame rate of the at least one first camera module (e.g., the camera modules 253 and 254 of FIG. 2 or the camera modules 413 and 414 of FIGS. 4A and 4B), based on that the particular object has moved to a designated area (e.g., a relatively upper area) of the first FOV at the third time point (or the particular object has moved out of the second FOV).

Alternatively, an operation for a case where a target to be tracked is highly likely to be positioned at the relatively right side of the position on which the electronic device 101 is worn may also be possible. For example, with respect to a particular object, the electronic device 101 may adjust the frame rate of at least one left camera module (e.g., the camera modules 253 and 255 of FIG. 2 or the camera modules 413 and 415 of FIGS. 4A and 4B), based on identification that the object is positioned in a left FOV at the first time point. For example, the electronic device 101 may turn on at least one right camera module (e.g., the camera modules 254 and 256 of FIG. 2 or the camera modules 414 and 416 of FIGS. 4A and 4B), based on that the particular object has moved to a designated area (e.g., a relatively right area) of the left FOV at the second time point. For example, the electronic device 101 may adjust the frame rate of the at least one first camera module (e.g., the camera modules 254 and 256 of FIG. 2 or the camera modules 414 and 416 of FIGS. 4A and 4B), based on that the particular object has moved to a designated area (e.g., a relatively right area) of a right FOV at the third time point (or the particular object has moved out of the left FOV). Alternatively, the electronic device 101 may also perform an operation for a particular object moving from the right to the left, and this operation may be the above operation of moving from the left to the right, in which the left camera modules and the right camera modules are replaced by each other.

As described above, there is no limit to the movement direction of an object. In an embodiment, the electronic device 101 may turn on camera modules and/or adjust a frame rate according to a result of object recognition. For example, the electronic device 101 may apply a policy of turning on camera modules and/or adjusting a frame rate illustrated in FIG. 8, to a target to be tracked that is highly likely to be positioned at a relatively lower side like a hand. For example, as described above, the electronic device 101 may apply various policies of turning on camera modules and/or adjusting a frame rate described above, to a target to be tracked that is highly likely to be positioned at a relatively upper side, or a target to be tracked that is highly likely to be positioned at a relatively right side.

Turning on a camera module and/or adjusting a frame rate may be performed, as described above, based on a movement of a target to be tracked from a relatively upper side to a relatively lower side, there is no limit to the movement direction thereof, and a person who skilled in the art will understand that same may also be applied to a different embodiment of the disclosure as well as this embodiment.

Figure 9:
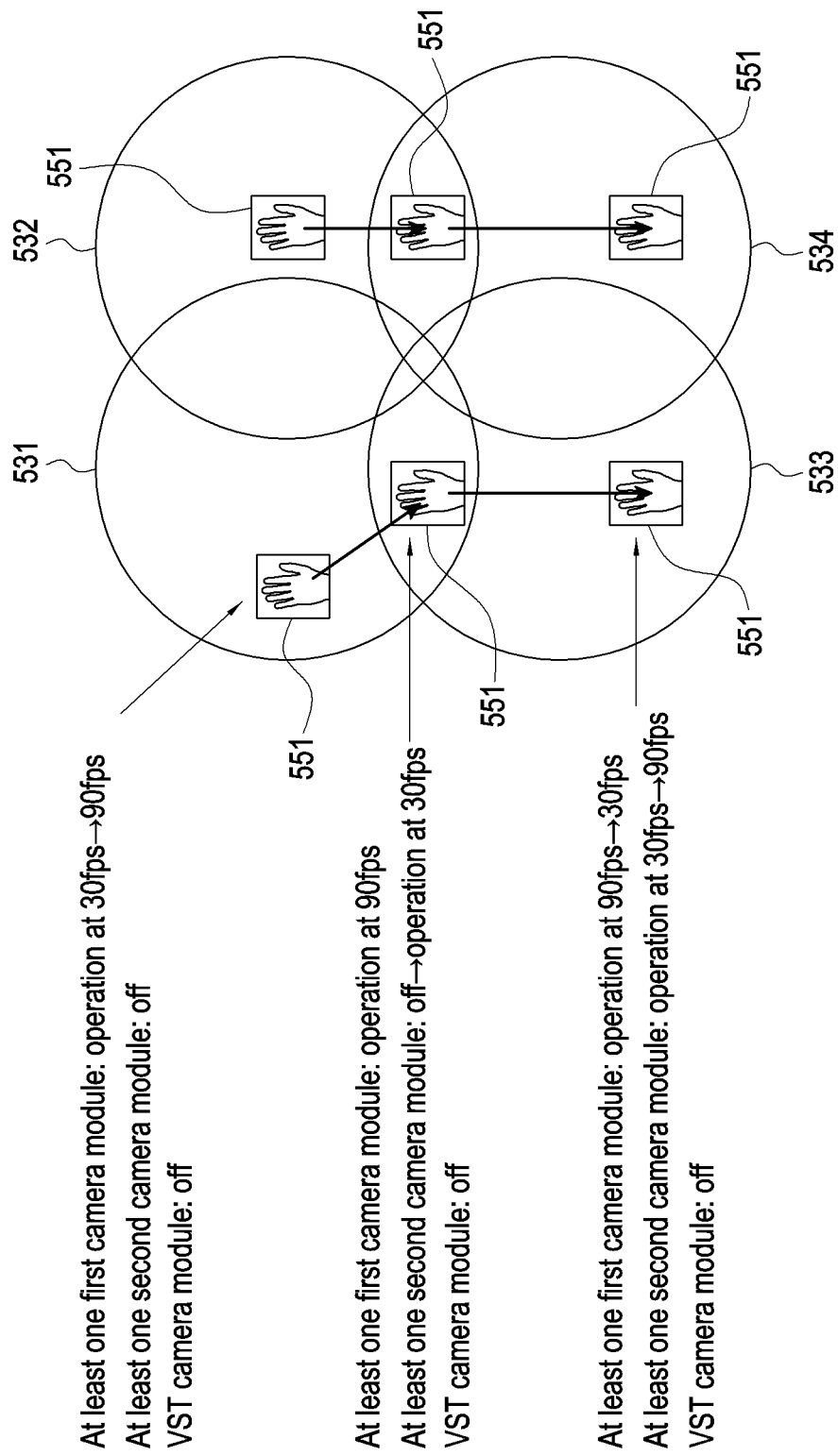
FIG. 9 is a diagram illustrating adjustment of a FOV and a frame rate of a VST device in a virtual reality (VR) mode according to an embodiment of the disclosure.

FIG. 9 is a diagram illustrating adjustment of the FOV and the frame rate of a VST device in a VR mode according to an embodiment of the disclosure.

According to an embodiment, the electronic device 400 of a VST device may operate in a VR mode or a VST mode. In the VR mode, the electronic device 400 may display images corresponding to both eyes, and a user may view the images corresponding to both eyes to experience a VR environment. A content provided in the VR mode may be a content not related to the surrounding environment of the user. On the contrary, in the VST mode, a content provided to the user may include at least a part of a captured image (or an object processed based on the at least a part thereof and/or an object corresponding to the at least a part thereof) of the surrounding environment of the user. For example, the electronic device 400 may display, as at least a part of a VST content, at least a part of an image (or an object processed based on the at least a part thereof and/or an object corresponding to the at least a part thereof) associated with the surrounding environment and captured via the VST camera modules 411 and 412. Accordingly, the user may identify at least a part of an image associated with the surrounding environment and captured via the VST camera modules 411 and 412. For example, a VST content may be generated by mixing a content for a VR environment and at least a part of an image captured via the VST camera modules 411 and 412. For example, a VST content may be generated by mixing a content for a VR environment and a result (or a corresponding object) of processing at least a part of an image captured via the VST camera modules 411 and 412. For example, a VST content may be generated based on at least a part of an image captured via the VST camera modules 411 and 412. For example, a VST content may be generated based on a result (or a corresponding object) of processing at least a part of an image captured via the VST camera modules 411 and 412.

In an embodiment of FIG. 9, the electronic device 400 executing the VR mode is employed. As described above, a content corresponding the VR mode may not be related to, for example, the surrounding environment of the electronic device 400, and accordingly, an image captured by the VST camera modules 411 and 412 may not be required in the VR mode. Therefore, as illustrated in FIG. 9, the VST camera modules 411 and 412 may maintain a turn-off state in the VR mode regardless of the position of the hand 551 and/or whether the hand is recognized.

According to an embodiment, the electronic device 400 may identify that the user's hand 551 is positioned in the first sub FOV 531 at a first time point. For example, the electronic device 400 may control at least one first camera module (e.g., the camera modules 414 and 416 of FIGS. 4A and 4B) to obtain an image frame at a first frame rate. The electronic device 400 may identify that the user's hand 551 is positioned in the first sub FOV 531, based on the image frame obtained by the least one first camera module (e.g., the camera modules 413 and 414 of FIGS. 4A and 4B). The electronic device 400 may adjust the frame rate of the least one first camera module (e.g., the camera modules 413 and 414 of FIGS. 4A and 4B) from the first frame rate (e.g., 30 fps) to a second frame rate (e.g., 90 fps), based on the hand 551 being recognized in the first sub FOV 531 that is a part of a first FOV. The electronic device 400 may track the hand 551, based on an image frame captured at the second frame rate. At least one second camera module (e.g., the camera modules 415 and 416 in FIGS. 4A and 4B) may maintain a turn-off state. The electronic device 400 may perform an operation, such as manipulation of an object included in a VR content, based on a result of tracking, and the operation thereof is not limited. As described above, in the VR mode, the VST camera modules 411 and 412 may maintain a turn-off state.

At a second time point, the user's hand 551 may move to an area (e.g., a designated area of the first FOV) in which the first sub FOV 531 and the third sub FOV 533 overlap with each other. The electronic device 400 may turn on the at least one second camera module (e.g., the camera modules 415 and 416 in FIGS. 4A and 4B), based on the hand 551 being positioned in the designated area of the first FOV. The electronic device 400 may control the at least one second camera module (e.g., the camera modules 415 and 416 in FIGS. 4A and 4B) to obtain an image frame at the first frame rate (e.g., 30 fps). As described above, in the VR mode, the VST camera modules 411 and 412 may maintain a turn-off state.

At a third time point, the user's hand 551 may move to a designated area of the third sub FOV 533. For example, the electronic device 400 may identify that the hand 551 has moved out of the designated area of the first FOV, based on the image frame obtained by the least one first camera module (e.g., the camera modules 413 and 414 of FIGS. 4A and 4B). Based on the user's hand 551 being disposed in the designated area of the third sub FOV 533, the electronic device 400 may adjust the frame rate of the at least one first camera module (e.g., the camera modules 413 and 414 of FIGS. 4A and 4B) from the second frame rate to the first frame rate, and adjust the frame rate of the at least one second camera module (e.g., the camera modules 415 and 416 in FIGS. 4A and 4B) from the first frame rate to the second frame rate. The electronic device 101 may track the hand 551, based on the image frame obtained by the at least one second camera module (e.g., the camera modules 415 and 416 in FIGS. 4A and 4B). As described above, in the VR mode, the VST camera modules 411 and 412 may maintain a turn-off state.

Figure 10:
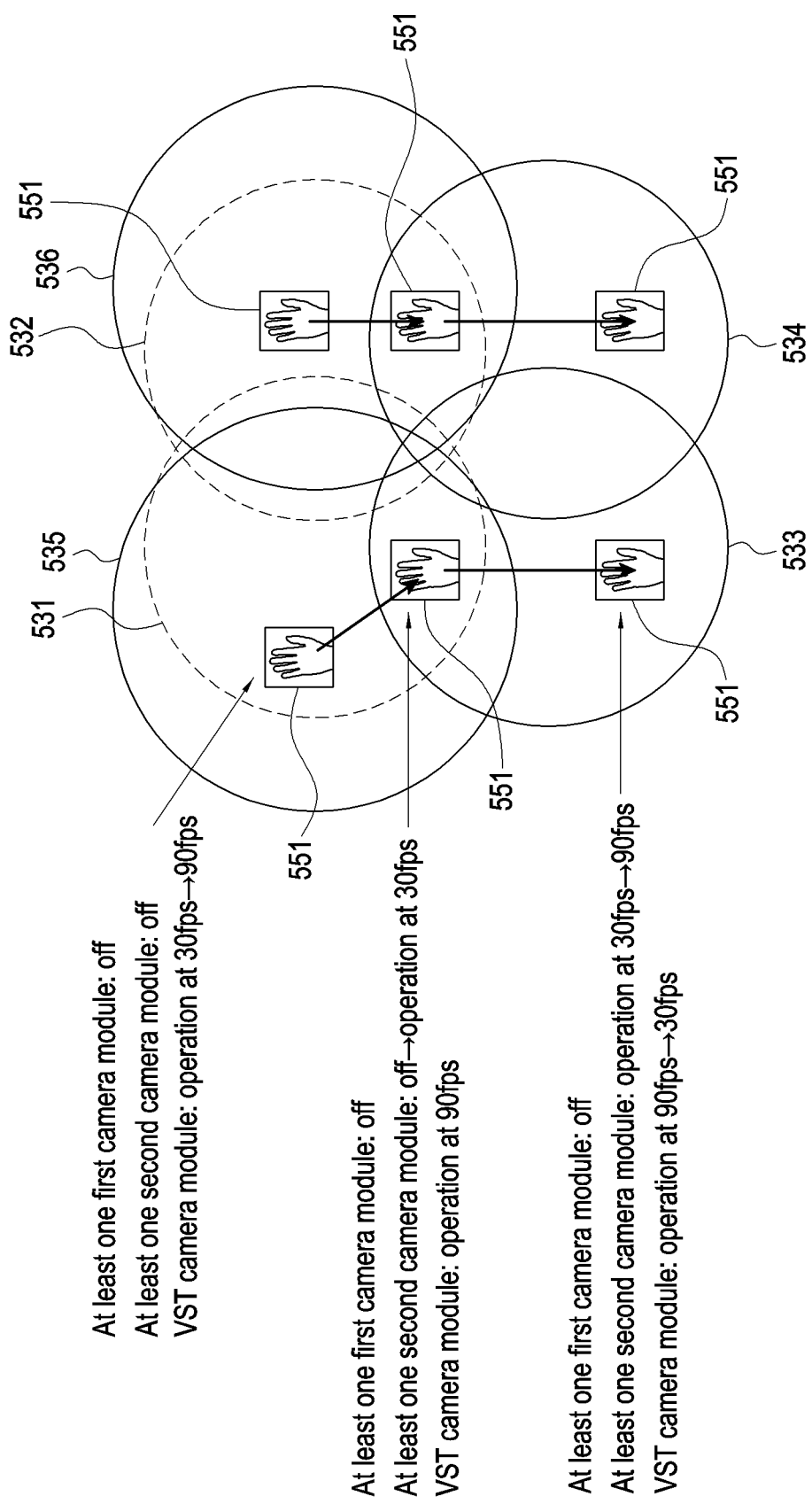
FIG. 10 is a diagram illustrating adjustment of a FOV and a frame rate of a VST device in a VST mode according to an embodiment of the disclosure.

FIG. 10 is a diagram illustrating adjustment of the FOV and the frame rate of a VST device in a VST mode according to an embodiment of the disclosure.

The electronic device 400 may operate in the VST mode in the embodiment of FIG. 10. As described above, in the VST mode, a content provided to a user may include at least a part of a captured image (or an object processed based on the at least a part thereof and/or an object corresponding to the at least a part thereof) of the surrounding environment of the user. Accordingly, the electronic device 400 may display, as at least a part of a VST content, at least a part of an image (or an object processed based on the at least a part thereof and/or an object corresponding to the at least a part thereof) associated with the surrounding environment and captured via the VST camera modules 411 and 412. As illustrated in FIG. 10, a fifth sub FOV 535 corresponding to the VST camera module 411 may include a large part of the first sub FOV 531, and a sixth sub FOV 536 corresponding to the VST camera module 412 may include a large part of the second sub FOV 532. Therefore, the electronic device 101 may perform 6DoF and/or SLAM, and/or recognize and/or track an object by using image frames obtained by the VST camera modules 411 and 412. When the VST camera modules 411 and 412 are turned on and obtain an image frame, at least one first camera module (e.g., the camera modules 413 and 414 in FIGS. 4A and 4B) may be turned off. For example, in the VR mode, image frames obtained by the at least one first camera module (e.g., the camera modules 413 and 414 in FIGS. 4A and 4B) may be used to perform 6DoF and/or SLAM, and/or recognize and/or track an object. For example, in the VST mode, image frames obtained by the VST camera modules 411 and 412 may be used to perform 6DoF and/or SLAM, and/or recognize and/or track an object. Accordingly, as illustrated in FIG. 10, the at least one first camera module (e.g., the camera modules 413 and 414 in FIGS. 4A and 4B) and at least one second camera module (e.g., the camera modules 415 and 416 in FIGS. 4A and 4B) may be maintained to be turned off.

According to an embodiment, the electronic device 400 may identify that the user's hand 551 is positioned in the fifth sub FOV 535 at a first time point. For example, the electronic device 400 may control the VST camera modules 411 and 412 to obtain an image frame at a first frame rate. The electronic device 400 may identify that the user's hand 551 is positioned in the fifth sub FOV 535, based on the image frame obtained by the VST camera modules 411 and 412. As described above, the fifth sub FOV 535 includes at least a part of the first sub FOV 531, the sixth sub FOV 536 includes at least a part of the second sub FOV 532, and thus the fifth sub FOV 535 and the sixth sub FOV 536 may correspond to a first FOV. The electronic device 400 may use the image frame obtained by the VST camera modules 411 and 412 as an image corresponding to the first FOV. For example, the electronic device 101 may perform, based on an image obtained by the VST camera modules 411 and 412, for example, turning on a camera module and/or controlling a frame rate, which is performed based on the image obtained by the at least one first camera module (e.g., the camera modules 413 and 414 in FIGS. 4A and 4B) in the embodiment of FIG. 6A For example, the at least one first camera module (e.g., the camera modules 413 and 414 in FIGS. 4A and 4B) is in a turn-off state, and thus the electronic device 101 may operate based on an image obtained by the VST camera modules 411 and 412.

According to an embodiment, the electronic device 400 may adjust the frame rate of the VST camera modules 411 and 412 from the first frame rate (e.g., 30 fps) to a second frame rate (e.g., 90 fps), based on the hand 551 being recognized in the fifth sub FOV 535. The electronic device 400 may track the hand 551, based on an image frame captured at the second frame rate. The at least one second camera module (e.g., the camera modules 415 and 416 in FIGS. 4A and 4B) may maintain a turn-off state. The electronic device 400 may perform an operation, such as manipulation of an object included in a VR content, based on a result of tracking, and the operation thereof is not limited. As described above, in the VST mode, the at least one first camera module (e.g., the camera modules 413 and 414 in FIGS. 4A and 4B) and at least one second camera module (e.g., the camera modules 415 and 416 in FIGS. 4A and 4B) may maintain a turn-off state.

At a second time point, the user's hand 551 may move to an area (e.g., a designated area of the first FOV) in which the fifth sub FOV 535 and the third sub FOV 533 overlap with each other. The electronic device 400 may turn on the at least one second camera module (e.g., the camera modules 415 and 416 in FIGS. 4A and 4B), based on the hand 551 being positioned in the designated area of the first FOV. The electronic device 400 may control the at least one second camera module (e.g., the camera modules 415 and 416 in FIGS. 4A and 4B) to obtain an image frame at the first frame rate (e.g., 30 fps). As described above, in the VST mode, the at least one first camera module (e.g., the camera modules 413 and 414 in FIGS. 4A and 4B) may maintain a turn-off state.

At a third time point, the user's hand 551 may move to a designated area of the third sub FOV 533. For example, the electronic device 400 may identify that the hand 551 has moved out of the designated area of the first FOV, based on the image frame obtained by the VST camera modules 411 and 412. Based on the user's hand 551 being disposed in the designated area of the third sub FOV 533, the electronic device 400 may adjust the frame rate of the VST camera modules 411 and 412 from the second frame rate to the first frame rate, and adjust the frame rate of the at least one second camera module (e.g., the camera modules 415 and 416 in FIGS. 4A and 4B) from the first frame rate to the second frame rate. The electronic device 101 may track the hand 551, based on the image frame obtained by the at least one second camera module (e.g., the camera modules 415 and 416 in FIGS. 4A and 4B). As described above, in the VST mode, the at least one first camera module (e.g., the camera modules 413 and 414 in FIGS. 4A and 4B) may maintain a turn-off state.

Figure 11:
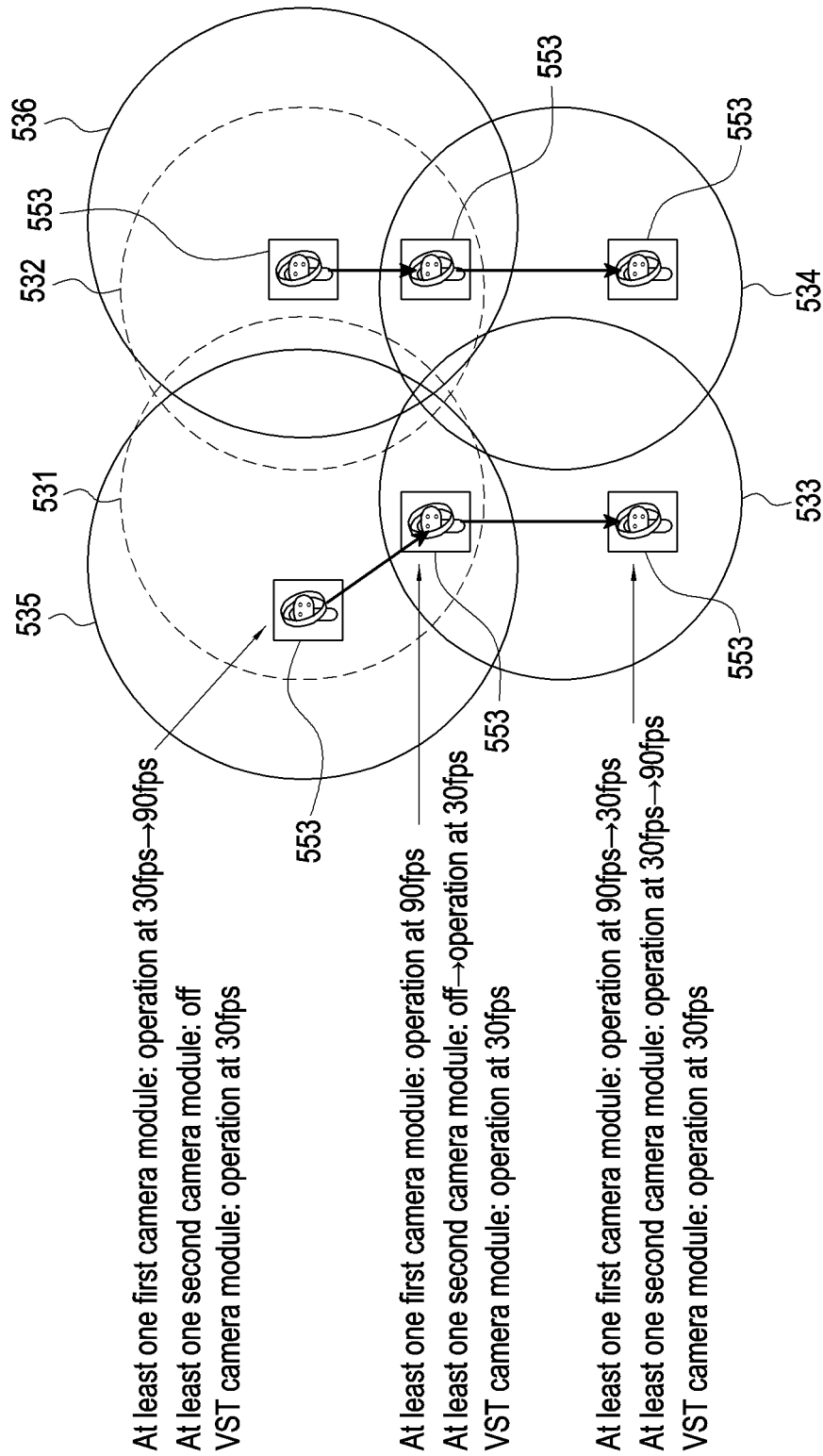
FIG. 11 is a diagram illustrating adjustment of a FOV and a frame rate of a VST device in a VST mode to which a controller is connected according to an embodiment of the disclosure.

FIG. 11 is a diagram illustrating adjustment of the FOV and the frame rate of a VST device in a VST mode to which a controller is connected according to an embodiment of the disclosure.

In an embodiment of FIG. 11, the electronic device 400 may be connected to a controller by wire or wireless. The electronic device 400 may establish a wireless communication with the controller, for example, based on short-range communication, but there is no limit. In FIG. 10, in the VST mode, the at least one first camera module (e.g., the camera modules 413 and 414 in FIGS. 4A and 4B) maintains a turn-off state. In FIG. 11, when a controller is connected, in the VST mode, the electronic device 101 may turn on at least one first camera module (e.g., the camera modules 413 and 414 in FIGS. 4A and 4B). For example, the electronic device 101 may recognize and/or track the controller, based on an image obtained by the least one first camera module (e.g., the camera modules 413 and 414 of FIGS. 4A and 4B). The electronic device 101 may also maintain a turn-on state of the VST camera modules 411 and 412 for a VST content. For example, in FIG. 11, a VST content may be provided using image frames obtained by the VST camera modules 411 and 412. The image obtained by the VST camera modules 411 and 412 is not used for tracking of the controller, and thus the VST camera modules 411 and 412 may operate at a frame rate that has a relatively low value (e.g., 30 fps).

According to an embodiment, the electronic device 400 may identify that a controller 553 is positioned in the first sub FOV 531 at a first time point. For example, the electronic device 400 may control the at least one first camera module (e.g., the camera modules 414 and 416 of FIGS. 4A and 4B) to obtain an image frame at a first frame rate. The electronic device 400 may identify that the controller 553 is positioned in the first sub FOV 531, based on an image frame obtained by the least one first camera module (e.g., the camera modules 413 and 414 of FIGS. 4A and 4B). The electronic device 400 may adjust the frame rate of the least one first camera module (e.g., the camera modules 413 and 414 of FIGS. 4A and 4B) from the first frame rate (e.g., 30 fps) to a second frame rate (e.g., 90 fps), based on the controller 553 being recognized in the first sub FOV 531 that is a part of a first FOV. The electronic device 400 may track the controller 553, based on an image frame captured at the second frame rate. At least one second camera module (e.g., the camera modules 415 and 416 in FIGS. 4A and 4B) may maintain a turn-off state. The electronic device 400 may perform an operation associated with manipulation of the controller, based on a result of tracking, and the operation thereof is not limited.

At a second time point, the controller 553 may move to an area (e.g., a designated area of the first FOV) in which the first sub FOV 531 and the third sub FOV 533 overlap with each other. The electronic device 400 may turn on the at least one second camera module (e.g., the camera modules 415 and 416 in FIGS. 4A and 4B), based on the controller 553 being positioned in the designated area of the first FOV. The electronic device 400 may control the at least one second camera module (e.g., the camera modules 415 and 416 in FIGS. 4A and 4B) to obtain an image frame at the first frame rate (e.g., 30 fps).

At a third time point, the controller 553 may move to a designated area of the third sub FOV 533. For example, the electronic device 400 may identify that the controller 553 has moved out of the designated area of the first FOV, based on the image frame obtained by the least one first camera module (e.g., the camera modules 413 and 414 of FIGS. 4A and 4B). Based on the controller 553 being disposed in the designated area of the third sub FOV 533, the electronic device 400 may adjust the frame rate of the at least one first camera module (e.g., the camera modules 413 and 414 of FIGS. 4A and 4B) from the second frame rate to the first frame rate, and adjust the frame rate of the at least one second camera module (e.g., the camera modules 415 and 416 in FIGS. 4A and 4B) from the first frame rate to the second frame rate. The electronic device 101 may track the controller 553, based on the image frame obtained by the at least one second camera module (e.g., the camera modules 415 and 416 in FIGS. 4A and 4B).

Figure 12:
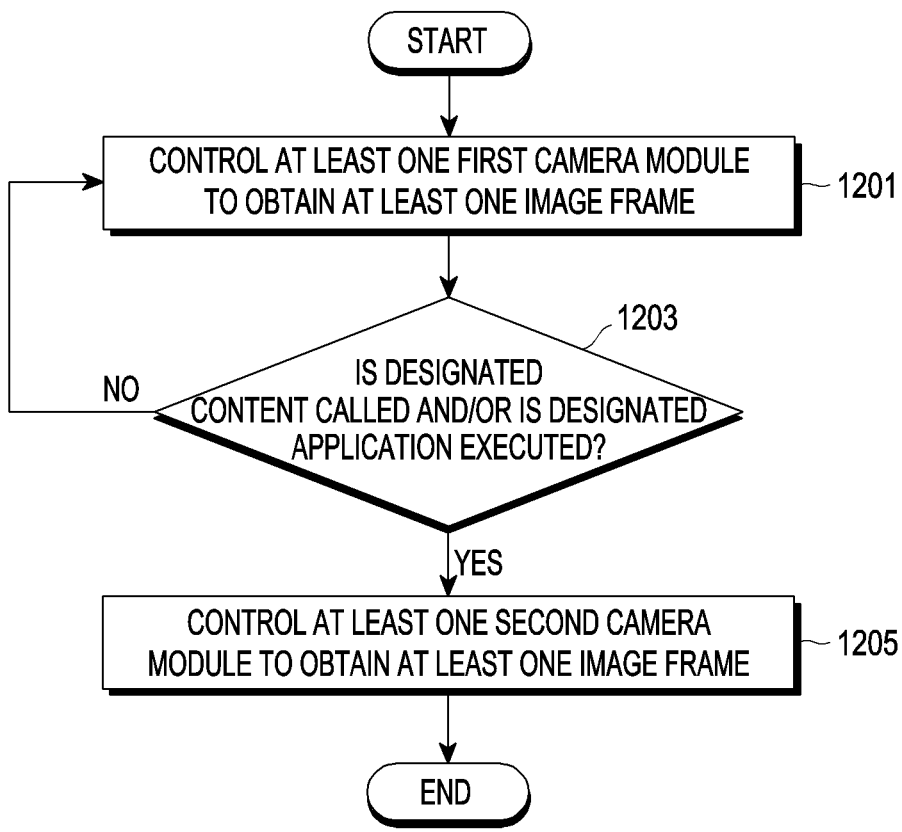
FIG. 12 is a flowchart illustrating a method of operating an electronic device according to an embodiment of the disclosure.

FIG. 12 is a flowchart illustrating a method of operating an electronic device according to an embodiment of the disclosure.

According to an embodiment, the electronic device 101 (e.g., the processor 120) may, in operation 1201, control at least one first camera module (e.g., the camera modules 253 and 254 of FIG. 2 or the camera modules 413 and 414 of FIGS. 4A and 4B) to obtain at least one image frame. The electronic device 101 may, in operation 1203, identify whether a designated content has been called and/or whether a designated application has been executed. For example, the designated content may be a content requiring recognition and/or tracking of an object (e.g., a hand) positioned relatively lower than the electronic device 101 in a case where a user puts on the electronic device 101. For example, if the object to be recognized and/or tracked is a hand, the content may be, for example, a virtual keyboard. For example, the designated application may be an application requiring recognition and/or tracking of an object (e.g., a hand) positioned relatively lower than the electronic device 101 in a case where a user puts on the electronic device 101. For example, if the object to be recognized and/or tracked is a hand, the application may be a piano playing application. Based on that calling of the designated content and/or execution of the designated application is identified (operation 1203—Yes), the electronic device 101 may, in operation 1205, control at least one second camera module (e.g., the camera modules 255 and 256 of FIG. 2 or the camera modules 415 and 416 of FIGS. 4A and 4B) to obtain at least one image frame. If calling of the designated content and/or execution of the designated application is not identified (operation 1203—No), the electronic device 101 may control the at least one first camera module (e.g., the camera modules 253 and 254 of FIG. 2 or the camera modules 413 and 414 of FIGS. 4A and 4B) to obtain at least one image frame. If the second camera module (e.g., the camera modules 255 and 256 of FIG. 2 or the camera modules 415 and 416 of FIGS. 4A and 4B) is in a turn-off state, the electronic device 101 may turn on the second camera module (e.g., the camera modules 255 and 256 of FIG. 2 or the camera modules 415 and 416 of FIGS. 4A and 4B), based on that calling of the designated content and/or execution of the designated application is identified. According to an embodiment, the electronic device 101 may turn off the second camera module (e.g., the camera modules 255 and 256 of FIG. 2 or the camera modules 415 and 416 of FIGS. 4A and 4B), based on that subsequent connection of a physical input device (e.g., a Bluetooth keyboard, a mobile phone, or a smart ring, but not limitation) is identified.

Figure 13:
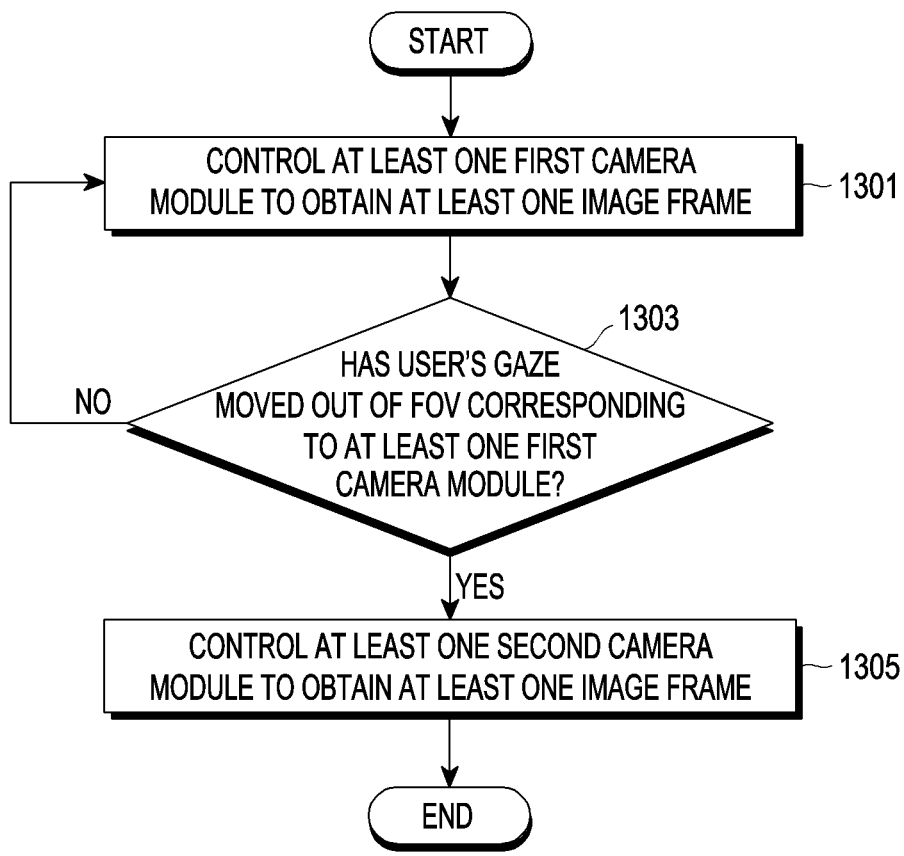
FIG. 13 is a flowchart illustrating a method of operating an electronic device according to an embodiment of the disclosure.

FIG. 13 is a flowchart illustrating a method of operating an electronic device according to an embodiment of the disclosure.

According to an embodiment, the electronic device 101 (e.g., the processor 120) may, in operation 1301, control at least one first camera module (e.g., the camera modules 253 and 254 of FIG. 2 or the camera modules 413 and 414 of FIGS. 4A and 4B) to obtain at least one image frame. The electronic device 101 may, in operation 1303, identify whether a user's gaze moves out of an FOV corresponding to the at least one first camera module (e.g., the camera modules 253 and 254 of FIG. 2 or the camera modules 413 and 414 of FIGS. 4A and 4B). For example, the electronic device 101 may identify the user's gaze, based on an image obtained by an ET camera module (e.g., the ET camera modules 251 and 252 of FIG. 2). For example, the electronic device 101 may process, in one coordinate system, the user's gaze based on an image obtained by the ET camera module (e.g., the ET camera modules 251 and 252 of FIG. 2) and an FOV corresponding a camera module (e.g., the camera modules 253 and 254 of FIG. 2 or the camera modules 413 and 414 of FIGS. 4A and 4B) for capturing a foreground image. The electronic device 101 may identify whether the user's gaze moves out of, for example, a first FOV. Based on that the user's gaze has moved out of the FOV corresponding to the at least one first camera module (e.g., the camera modules 253 and 254 of FIG. 2 or the camera modules 413 and 414 of FIGS. 4A and 4B) (e.g., same has moved out of the first FOV) (operation 1303—Yes), the electronic device 101 may, in operation 1305, control at least one second camera module (e.g., the camera modules 255 and 256 of FIG. 2 or the camera modules 415 and 416 of FIGS. 4A and 4B) to obtain at least one image frame. If the user's gaze does not move out of the FOV corresponding to the at least one first camera module (e.g., the camera modules 253 and 254 of FIG. 2 or the camera modules 413 and 414 of FIGS. 4A and 4B) (e.g., same does not move out of the first FOV) (operation 1303—No), the electronic device 101 may, in operation 1301, control the at least one first camera module (e.g., the camera modules 253 and 254 of FIG. 1 or the camera modules 413 and 414 of FIGS. 4A and 4B) to obtain at least one image frame. If the second camera module (e.g., the camera modules 255 and 256 of FIG. 2 or the camera modules 415 and 416 of FIGS. 4A and 4B) is in a turn-off state, the electronic device 101 may turn on the second camera module (e.g., the camera modules 255 and 256 of FIG. 2 or the camera modules 415 and 416 of FIGS. 4A and 4B), based on that escape from the FOV corresponding to the first camera module (e.g., the camera modules 253 and 254 of FIG. 2 or the camera modules 413 and 414 of FIGS. 4A and 4B).

According to an embodiment, a wearable electronic device (the electronic device 101 in FIG. 1, the electronic device 200 in FIG. 2, or the electronic device 400 in FIGS. 4A and 4B) may include a housing 210a, 210b, 210c including a structure enabling wearing on at least a part of a user's head, at least one processor 120 included in the housing 210a, 210b, 210c, at least one first camera module (the camera modules 253 and 254 in FIG. 2 or the camera modules 413 and 414 in FIGS. 4A and 4B) configured to capture an image for a first FOV configured with respect to one point on a first surface of the housing 210a, 210b, 210c, and at least one second camera module (e.g., the camera modules 255 and 256 in FIG. 2 or the camera modules 415 and 416 in FIGS. 4A and 4B) configured to capture an image for a second FOV different from the first FOV configured with respect to the one point on the first surface. The at least one processor 120 may be configured to control the at least one first camera module (the camera modules 253 and 254 in FIG. 2 or the camera modules 413 and 414 in FIGS. 4A and 4B) to obtain first image frames at a first frame rate. The at least one processor 120 may be configured to, based on identification, based on at least a part of the first image frames, that a user's hand is disposed in a designated area of the first FOV, control the at least one first camera module (the camera modules 253 and 254 in FIG. 2 or the camera modules 413 and 414 in FIGS. 4A and 4B) to obtain second image frames at a second frame rate greater than the first frame rate. The at least one processor 120 may be configured to control the at least one second camera module (the camera modules 255 and 256 in FIG. 2 or the camera modules 415 and 416 in FIGS. 4A and 4B) to maintain the at least one second camera module (the camera modules 255 and 256 in FIG. 2 or the camera modules 415 and 416 in FIGS. 4A and 4B) in an inactive state, or to activate the at least one second camera module (e.g., the camera modules 255 and 256 in FIG. 2 or the camera modules 415 and 416 in FIGS. 4A and 4B) and operate the at least one second camera module (e.g., the camera modules 255 and 256 in FIG. 2 or the camera modules 415 and 416 in FIGS. 4A and 4B) at the first frame rate.

According to an embodiment, the at least one processor 120 may be configured to, as at least a part of the activating the at least one second camera module (e.g., the camera modules 255 and 256 of FIG. 2 or the camera modules 415 and 416 of FIGS. 4A and 4B), based on identification that the user's hand is disposed in the designated area of the first FOV and satisfaction of at least one first additional condition configured to activate the at least one second camera module (e.g., the camera modules 255 and 256 of FIG. 2 or the camera modules 415 and 416 of FIGS. 4A and 4B), activate the at least one second camera module (e.g., the camera modules 255 and 256 of FIG. 2 or the camera modules 415 and 416 of FIGS. 4A and 4B).

According to an embodiment, a distance from the second FOV to the designated area of the first FOV may be shorter than a distance from the second FOV to a remaining area except for the designated area from the first FOV.

According to an embodiment, the at least one processor 120 may be configured to, as at least a part of the controlling, based on identification that the user's hand is disposed in the first FOV, the at least one first camera module (the camera modules 253 and 254 in FIG. 2 or the camera modules 413 and 414 in FIGS. 4A and 4B) to obtain the second image frames at the second frame rate greater than the first frame rate, control the at least one first camera module (the camera modules 253 and 254 in FIG. 2 or the camera modules 413 and 414 in FIGS. 4A and 4B) to obtain the second image frames at the second frame rate, based on identification that the user's hand is disposed in the first FOV and satisfaction of at least one second additional condition for changing a frame rate of the at least one first camera module (the camera modules 253 and 254 in FIG. 2 or the camera modules 413 and 414 in FIGS. 4A and 4B).

According to an embodiment, the at least one processor 120 may be configured to control the at least one second camera module (e.g., the camera modules 255 and 256 of FIG. 2 or the camera modules 415 and 416 of FIGS. 4A and 4B) to obtain third image frames at the first frame rate.

According to an embodiment, the at least one processor 120 may be configured to identify whether the hand is disposed in a designated area of the second FOV and/or the hand has moved out of the first FOV, based on at least a part of the at least one second image frame and/or the at least one third image frame. The at least one processor 120 may be configured to, based on identification that the hand is disposed in the designated area of the second FOV and/or the hand has moved out of the first FOV, control the at least one first camera module (the camera modules 253 and 254 in FIG. 2 or the camera modules 413 and 414 in FIGS. 4A and 4B) to obtain fourth image frames. The at least one processor 120 may be configured to control the at least one second camera module (e.g., the camera modules 255 and 256 of FIG. 2 or the camera modules 415 and 416 of FIGS. 4A and 4B) to obtain fifth image frames at the second frame rate greater than the first frame rate.

According to an embodiment, the at least one processor 120 may be configured to, as at least a part of the controlling the at least one second camera module (e.g., the camera modules 255 and 256 of FIG. 2 or the camera modules 415 and 416 of FIGS. 4A and 4B) to obtain the fifth image frames at the second frame rate, based on identification that the hand is disposed in the designated area of the second FOV and/or the hand has moved out of the first FOV, and satisfaction of at least one third additional condition for changing a frame rate of the at least one second camera module (the camera modules 255 and 256 of FIG. 2; the camera modules 415 and 416 of FIGS. 4A and 4B), control the at least one second camera module (e.g., the camera modules 255 and 256 in FIG. 2 or the camera modules 415 and 416 in FIGS. 4A and 4B) to obtain the fifth image frames at the second frame rate.

According to an embodiment, the at least one processor 120 may be configured to, as at least a part of the controlling the at least one first camera module (the camera modules 253 and 254 of FIG. 2 or the camera modules 413 and 414 of FIGS. 4A and 4B) to obtain the fourth image frames, control the at least one first camera module (the camera modules 253 and 254 of FIG. 2 or the camera modules 413 and 414 of FIGS. 4A and 4B) to obtain the fourth image frames at the first frame rate.

According to an embodiment, the wearable electronic device 101 may further include at least one third camera (the VST camera modules 411 and 412) configured to capture an image for at least a part of the first FOV configured with respect to the one point on the first surface of the housing 210a, 210b, 210c.

According to an embodiment, the at least one processor 120 may be configured to, based on identification that a VR mode is executed, perform 6DoF, SLAM, object recognition, and/or object tracking, based on at least a part of the first image frame, the second image frame, and/or the third image frame. The at least one processor 120 may be configured to perform at least one operation based on the VR mode, based on a result of the object recognition and/or the object tracking. While the VR mode is being executed, the at least one third camera (the VST camera modules 411 and 412) may maintain an inactive state.

According to an embodiment, the at least one processor 120 may be configured to, based on identification that a VST mode is executed, control the at least one third camera (the VST camera modules 411 and 412) to obtain sixth image frames. The at least one first camera module (the camera modules 253 and 254 in FIG. 2; the camera modules 413 and 414 in FIGS. 4A and 4B) and the at least one second camera module (the camera modules 255 and 256 of FIG. 2; the camera modules 415 and 416 of FIGS. 4A and 4B) may be deactivated while the sixth image frames are being obtained. The at least one processor 120 may be configured to, based on identification, based on at least a part of the sixth image frames, that the user's hand is disposed in the designated area of the first FOV, control the at least one third camera (the VST camera modules 411 and 412) to obtain seventh image frames. The at least one first camera module (the camera modules 253 and 254 in FIG. 2; the camera modules 413 and 414 in FIGS. 4A and 4B) may be deactivated while the seventh image frames are being obtained. The at least one processor 120 may be configured to control the at least one second camera module (the camera modules 255 and 256 of FIG. 2 or the camera modules 415 and 416 of FIGS. 4A and 4B) to activate the at least one second camera module (e.g., the camera modules 255 and 256 of FIG. 2 or the camera modules 415 and 416 of FIGS. 4A and 4B) and to obtain eighth image frames. The at least one first camera module (the camera modules 253 and 254 in FIG. 2; the camera modules 413 and 414 in FIGS. 4A and 4B) may be deactivated while the eighth image frames are being obtained.

According to an embodiment, the at least one processor 120 may be configured to, based on identification that a VST mode is executed and at least one controller is connected to the wearable electronic device, control the at least one first camera module (the camera modules 253 and 254 of FIG. 2 or the camera modules 413 and 414 of FIGS. 4A and 4B) to obtain ninth image frames, and control the at least one third camera (the VST camera modules 411 and 412) to obtain tenth image frames. The at least one second camera module (the camera modules 255 and 256 of FIG. 2; the camera modules 415 and 416 of FIGS. 4A and 4B) may be deactivated while the tenth image frames are being obtained, and the tenth image frames may be used to configure a VST content. The at least one processor 120 may be configured to, based on identification, based on at least a part of the ninth image frames, that the controller is disposed in the designated area of the first FOV, control the at least one first camera module (the camera modules 253 and 254 of FIG. 2 or the camera modules 413 and 414 of FIGS. 4A and 4B) to obtain eleventh image frames. The at least one third camera (the VST camera modules 411 and 412) may be controlled to obtain twelfth image frames, and the twelfth image frames may be used to configure the VST content. The at least one processor 120 may be configured to control the at least one second camera module (the camera modules 255 and 256 of FIG. 2 or the camera modules 415 and 416 of FIGS. 4A and 4B) to activate the at least one second camera module (e.g., the camera modules 255 and 256 of FIG. 2 or the camera modules 415 and 416 of FIGS. 4A and 4B) and to obtain thirteenth image frames, and control the at least one third camera (the VST camera modules 411 and 412) to obtain fourteenth image frames. The fourteenth image frames may be used to configure the VST content.

According to an embodiment, a method of operating a wearable electronic device (the electronic device 101 in FIG. 1, the electronic device 200 in FIG. 2, or the electronic device 400 in FIGS. 4A and 4B) including at least one first camera module (the camera modules 253 and 254 in FIG. 2; the camera modules 413 and 414 in FIGS. 4A and 4B) configured to capture an image for a first FOV and at least one second camera module (e.g., the camera modules 255 and 256 in FIG. 2 or the camera modules 415 and 416 in FIGS. 4A and 4B) configured to capture an image for a second FOV different from the first FOV may include controlling the at least one first camera module (the camera modules 253 and 254 in FIG. 2 or the camera modules 413 and 414 in FIGS. 4A and 4B) to obtain first image frames at a first frame rate. The method may include controlling the at least one first camera module (the camera modules 253 and 254 in FIG. 2 or the camera modules 413 and 414 in FIGS. 4A and 4B) to obtain second image frames at a second frame rate greater than the first frame rate, based on identification, based on at least a part of the first image frames, that a user's hand is disposed in a designated area of the first FOV. The method may include controlling the at least one second camera module (the camera modules 255 and 256 in FIG. 2 or the camera modules 415 and 416 in FIGS. 4A and 4B) to maintain the at least one second camera module (e.g., the camera modules 255 and 256 in FIG. 2 or the camera modules 415 and 416 in FIGS. 4A and 4B) in an inactive state, or to activate the at least one second camera module (e.g., the camera modules 255 and 256 in FIG. 2 or the camera modules 415 and 416 in FIGS. 4A and 4B) and operate the at least one second camera module (e.g., the camera modules 255 and 256 in FIG. 2 or the camera modules 415 and 416 in FIGS. 4A and 4B) at the first frame rate.

According to an embodiment, the activating of the at least one second camera module (e.g., the camera modules 255 and 256 of FIG. 2 or the camera modules 415 and 416 of FIGS. 4A and 4B) may include, based on identification that the user's hand is disposed in the designated area of the first FOV and satisfaction of at least one first additional condition configured to activate the at least one second camera module (e.g., the camera modules 255 and 256 of FIG. 2 or the camera modules 415 and 416 of FIGS. 4A and 4B), activating the at least one second camera module (e.g., the camera modules 255 and 256 of FIG. 2 or the camera modules 415 and 416 of FIGS. 4A and 4B).

According to an embodiment, the controlling of the at least one first camera module (the camera modules 253 and 254 in FIG. 2 or the camera modules 413 and 414 in FIGS. 4A and 4B) to obtain the second image frames at the second frame rate greater than the first frame rate, based on identification that the user's hand is disposed in the first FOV may include, based on identification that the user's hand is disposed in the first FOV and satisfaction of at least one second additional condition for changing a frame rate of the at least one first camera module (the camera modules 253 and 254 in FIG. 2; the camera modules 413 and 414 in FIGS. 4A and 4B), controlling the at least one first camera module (the camera modules 253 and 254 in FIG. 2 or the camera modules 413 and 414 in FIGS. 4A and 4B) to obtain the second image frames at the second frame rate.

According to an embodiment, the method may further include controlling the at least one second camera module (e.g., the camera modules 255 and 256 of FIG. 2 or the camera modules 415 and 416 of FIGS. 4A and 4B) to obtain third image frames at the first frame rate.

According to an embodiment, the method may include identifying whether the hand is disposed in a designated area of the second FOV and/or the hand has moved out of the first FOV, based on at least a part of the at least one second image frame and/or the at least one third image frame. The method may include, based on identification that the hand is disposed in the designated area of the second FOV and/or the hand has moved out of the first FOV, controlling the at least one first camera module (the camera modules 253 and 254 in FIG. 2 or the camera modules 413 and 414 in FIGS. 4A and 4B) to obtain fourth image frames. The method may include controlling the at least one second camera module (e.g., the camera modules 255 and 256 of FIG. 2 or the camera modules 415 and 416 of FIGS. 4A and 4B) to obtain fifth image frames at the second frame rate greater than the first frame rate.

According to an embodiment, the controlling of the at least one second camera module (e.g., the camera modules 255 and 256 of FIG. 2 or the camera modules 415 and 416 of FIGS. 4A and 4B) to obtain the fifth image frames at the second frame rate may include, based on identification that the hand is disposed in a designated area of the second FOV and/or the hand has moved out of the first FOV, and satisfaction of at least one third additional condition for changing a frame rate of the at least one second camera module (the camera modules 255 and 256 of FIG. 2; the camera modules 415 and 416 of FIGS. 4A and 4B), controlling the at least one second camera module (e.g., the camera modules 255 and 256 in FIG. 2 or the camera modules 415 and 416 in FIGS. 4A and 4B) to obtain the fifth image frames at the second frame rate.

According to an embodiment, the controlling of the at least one first camera module (the camera modules 253 and 254 of FIG. 2 or the camera modules 413 and 414 of FIGS. 4A and 4B) to obtain the fourth image frames may include controlling the at least one first camera module (the camera modules 253 and 254 of FIG. 2 or the camera modules 413 and 414 of FIGS. 4A and 4B) to obtain the fourth image frames at the first frame rate.

According to an embodiment, the wearable electronic device may further include at least one third camera (the VST camera modules 411 and 412) configured to capture an image for at least a part of the first FOV configured with respect to one point on a first surface of a housing 210*a*, 210*b*, 210*c*. The method of the wearable electronic device may include, based on identification that a VR mode is executed, performing 6DoF, SLAM, object recognition, and/or object tracking, based on at least a part of the first image frame, the second image frame, and/or the third image frame. The method may include performing at least one operation based on the VR mode, based on a result of the object recognition and/or the object tracking. While the VR mode is being executed, the at least one third camera (the VST camera modules 411 and 412) may maintain an inactive state.

The electronic device according to various embodiments disclosed herein may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with/to" or "connected with/to" another element (e.g., a second element), it means that the element may be coupled/connected with/to the other element directly (e.g., wiredly), wirelessly, or via a third element.

As used in embodiments of the disclosure, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to embodiments, each element (e.g., a module or a program) of the above-described elements may include a single entity or multiple entities, and some of the multiple entities may be separately disposed in any other element. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A wearable electronic device comprising:
   a housing including a structure enabling wearing on at least a part of a user's head;
   at least one processor included in the housing;
   at least one first camera module configured to capture an image for a first field of view (FOV) configured with respect to one point on a first surface of the housing; and
   at least one second camera module configured to capture an image for a second FOV different from the first FOV configured with respect to the one point on the first surface,
   wherein the at least one processor is configured to:
   control the at least one first camera module to obtain first image frames at a first frame rate, based on identification, based on at least a part of the
first image frames, that a user's hand is disposed in
a designated area of the first FOV:
control the at least one first camera module to obtain
second image frames at a second frame rate greater
than the first frame rate, and
control the at least one second camera module to
maintain the at least one second camera module in an
inactive state, or to activate the at least one second
camera module and operate the at least one second
camera module at the first frame rate.

2. The wearable electronic device of claim 1, wherein the at least one processor is configured to, as at least a part of the activating the at least one second camera module,
based on identification that the user's hand is disposed in the designated area of the first FOV and satisfaction of at least one first additional condition configured to activate the at least one second camera module, activate the at least one second camera module.

3. The wearable electronic device of claim 1, wherein a distance from the second FOV to the designated area of the first FOV is shorter than a distance from the second FOV to a remaining area except for the designated area from the first FOV.

4. The wearable electronic device of claim 1, wherein the at least one processor is configured to, as at least a part of the controlling, based on identification that the user's hand is disposed in the first FOV, the at least one first camera module to obtain the second image frames at the second frame rate greater than the first frame rate,
based on identification that the user's hand is disposed in the first FOV and satisfaction of at least one second additional condition for changing a frame rate of the at least one first camera module, control the at least one first camera module to obtain the second image frames at the second frame rate.

5. The wearable electronic device of claim 1, wherein the at least one processor is further configured to, control the at least one second camera module to obtain third image frames at the first frame rate.

6. The wearable electronic device of claim 5, wherein the at least one processor is further configured to:
identify whether the user's hand is disposed in a designated area of the second FOV and/or the user's hand has moved out of the first FOV, based on at least a part of second image frames and/or the third image frames, and
based on identification that the user's hand is disposed in the designated area of the second FOV and/or the user's hand has moved out of the first FOV:
control the at least one first camera module to obtain fourth image frames, and
control the at least one second camera module to obtain fifth image frames at the second frame rate greater than the first frame rate.

7. The wearable electronic device of claim 6, wherein the at least one processor is configured to, as at least a part of the controlling the at least one second camera module to obtain the fifth image frames at the second frame rate,
based on identification that the user's hand is disposed in the designated area of the second FOV and/or the user's hand has moved out of the first FOV, and satisfaction of at least one third additional condition for changing a frame rate of the at least one second camera module, control the at least one second camera module to obtain the fifth image frames at the second frame rate.

8. The wearable electronic device of claim 6, wherein the at least one processor is configured to, as at least a part of the controlling the at least one first camera module to obtain the fourth image frames, control the at least one first camera module to obtain the fourth image frames at the first frame rate.

9. The wearable electronic device of claim 1, further comprising:
at least one third camera configured to capture an image for at least a part of the first FOV configured with respect to the one point on the first surface of the housing.

10. The wearable electronic device of claim 9,
wherein the at least one processor is further configured to, based on identification that a virtual reality (VR) mode is executed:
perform 6 degrees of freedom (DoF), simultaneous localization and mapping (SLAM), object recognition, and/or object tracking, based on at least a part of the first image frames, the second image frames, and/or the third image frames, and
perform at least one operation based on the VR mode, based on a result of the object recognition and/or the object tracking, and
wherein the at least one third camera maintains an inactive state while the VR mode is being executed.

11. The wearable electronic device of claim 9, wherein the at least one processor is further configured to, based on identification that a video see-through (VST) mode is executed:
control the at least one third camera to obtain sixth image frames, wherein the at least one first camera module and the at least one second camera module are deactivated while the sixth image frames are being obtained; and
based on identification, based on at least a part of the sixth image frames, that the user's hand is disposed in the designated area of the first FOV:
control the at least one third camera to obtain seventh image frames, wherein the at least one first camera module is deactivated while the seventh image frames are being obtained, and
control the at least one second camera module to activate the at least one second camera module and to obtain eighth image frames, wherein the at least one first camera module is deactivated while the eighth image frames are being obtained.

12. The wearable electronic device of claim 1, wherein the at least one processor is further configured to, based on identification that a video see-through (VST) mode is executed and at least one controller is connected to the wearable electronic device:
control the at least one first camera module to obtain ninth image frames, and control the at least one third camera to obtain tenth image frames, wherein the at least one second camera module is deactivated while the tenth image frames are being obtained, and wherein the tenth image frames are used to configure a VST content; and
based on identification, based on at least a part of the ninth image frames, that the controller is disposed in the designated area of the first FOV:
control the at least one first camera module to obtain eleventh image frames, and control the at least one third camera to obtain twelfth image frames, wherein the twelfth image frames are used to configure the VST content, and control the at least one second camera module to activate the at least one second camera module and to obtain thirteenth image frames, and control the at least one third camera to obtain fourteenth image frames, wherein the fourteenth image frames are used to configure the VST content.

13. A method of operating a wearable electronic device including at least one first camera module configured to capture an image for a first field of view (FOV) and at least one second camera module configured to capture an image for a second FOV different from the first FOV, the method comprising:
controlling the at least one first camera module to obtain first image frames at a first frame rate; and
based on identification, based on at least a part of the first image frames, that a user's hand is disposed in a designated area of the first FOV:
controlling the at least one first camera module to obtain second image frames at a second frame rate greater than the first frame rate, and
controlling the at least one second camera module to maintain the at least one second camera module in an inactive state, or to activate the at least one second camera module and operate the at least one second camera module at the first frame rate.

14. The method of claim 13, wherein the controlling of the at least one first camera module to obtain the second image frames at the second frame rate greater than the first frame rate, based on identification that the user's hand is disposed in the first FOV comprises:
based on identification that the user's hand is disposed in the first FOV and satisfaction of at least one second additional condition for changing a frame rate of the at least one first camera module, controlling the at least one first camera module to obtain the second image frames at the second frame rate.

15. The method of claim 13, further comprising:
controlling the at least one second camera module to obtain third image frames at the first frame rate.

16. The method of claim 15, further comprising:
identifying whether the user's hand is disposed in a designated area of the second FOV and/or the user's hand has moved out of the first FOV, based on at least a part of the second image frames and/or the third image frames; and
based on identification that the user's hand is disposed in the designated area of the second FOV and/or the user's hand has moved out of the first FOV:
controlling the at least one first camera module to obtain fourth image frames, and
controlling the at least one second camera module to obtain fifth image frames at the second frame rate greater than the first frame rate.

17. The method of claim 16, wherein the controlling of the at least one second camera module to obtain the fifth image frames at the second frame rate comprises:
based on identification that the user's hand is disposed in a designated area of the second FOV and/or the user's hand has moved out of the first FOV, and satisfaction of at least one third additional condition for changing a frame rate of the at least one second camera module, controlling the at least one second camera module to obtain the fifth image frames at the second frame rate.

18. The method of claim 16, wherein the controlling of the at least one first camera module to obtain the fourth image frames comprises controlling the at least one first camera module to obtain the fourth image frames at the first frame rate.

19. The method of claim 13,
wherein the wearable electronic device further comprises at least one third camera configured to capture an image for at least a part of the first FOV configured with respect to one point on a first surface of a housing,
wherein the method of the wearable electronic device further comprises, based on identification that a virtual reality (VR) mode is executed:
performing 6 degrees of freedom (DoF), simultaneous localization and mapping (SLAM), object recognition, and/or object tracking, based on at least a part of the first image frames, the second image frames, and/or the third image frames, and
performing at least one operation based on the VR mode, based on a result of the object recognition and/or the object tracking, and
wherein the at least one third camera maintains an inactive state while the VR mode is being executed.

20. At least one non-transitory computer readable recording medium including instructions, which when executed, perform a method of operating a wearable electronic device including at least one first camera module configured to capture an image for a first field of view (FOY) and at least one second camera module configured to capture an image for a second FOV different from the first FOV, the method comprising:
controlling the at least one first camera module to obtain first image frames at a first frame rate; and
based on identification, based on at least a part of the first image frames, that a user's hand is disposed in a designated area of the first FOV:
controlling the at least one first camera module to obtain second image frames at a second frame rate greater than the first frame rate, and
controlling the at least one second camera module to maintain the at least one second camera module in an inactive state, or to activate the at least one second camera module and operate the at least one second camera module at the first frame rate.

* * * * *